United States Patent
Eger et al.

(10) Patent No.: US 12,470,953 B2
(45) Date of Patent: Nov. 11, 2025

(54) TECHNIQUES FOR MACHINE LEARNING BASED PEAK TO AVERAGE POWER RATIO REDUCTION

(71) Applicant: QUALCOMM Incorporated, San Diego, CA (US)

(72) Inventors: Ory Eger, Tel Aviv (IL); Assaf Touboul, Netanya (IL); Idan Michael Horn, Hod Hasharon (IL); Guy Wolf, Rosh Haayin (IL); Sharon Levy, Binyamina (IL); Noam Zach, Kiryat Ono (IL); Ori Ben Shahar, Petach Tikva (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 514 days.

(21) Appl. No.: 17/336,025

(22) Filed: Jun. 1, 2021

(65) Prior Publication Data

US 2022/0386151 A1    Dec. 1, 2022

(51) Int. Cl.
*G06N 3/0442* (2023.01)
*G06N 3/0464* (2023.01)
*G06N 3/08* (2023.01)
*H04L 27/26* (2006.01)
*H04W 8/24* (2009.01)
*H04W 24/02* (2009.01)
*H04W 24/04* (2009.01)
*H04W 24/10* (2009.01)
*H04W 76/10* (2018.01)

(52) U.S. Cl.
CPC .............. *H04W 24/04* (2013.01); *G06N 3/08* (2013.01); *H04W 8/24* (2013.01); *H04W 76/10* (2018.02)

(58) Field of Classification Search
CPC ....... H04W 24/04; H04W 76/10; H04W 8/24; G06N 3/08
See application file for complete search history.

(56) References Cited

U.S. PATENT DOCUMENTS

| | | | |
|---|---|---|---|
| 2018/0375706 A1* | 12/2018 | Pesin | H04L 27/3809 |
| 2020/0204419 A1* | 6/2020 | Megretski | H04B 1/12 |
| 2021/0064996 A1* | 3/2021 | Wang | H04W 24/08 |
| 2021/0399935 A1* | 12/2021 | Wang | H04W 72/0453 |
| 2023/0163816 A1* | 5/2023 | Zhao | H04B 7/0417 |
| | | | 375/267 |

FOREIGN PATENT DOCUMENTS

WO    WO-2017101082 A1 *    6/2017    ........... H04B 1/0071

* cited by examiner

*Primary Examiner* — Sulaiman Nooristany
(74) *Attorney, Agent, or Firm* — Holland & Hart LLP

(57) ABSTRACT

Methods, systems, and devices for wireless communications are described. In some examples, a transmitting device (e.g., a base station) may utilize machine learning to modify a signal as conditions of a channel change to reduce a peak to average power (PAPR). For example, a base station may select a type of machine learning. The base station may receive one or more feedback messages related to a condition of a channel and modify a downlink signal based on the selected type of machine learning and the one or more feedback messages. In some cases, the base station may transmit the modified downlink signal to a user equipment (UE) along with information indicating the modified downlink signal and the UE may reconstruct the downlink signal based on the information.

17 Claims, 17 Drawing Sheets

Modified Signal 215

Capability Messages 230

Information 220

Machine Learning Indication 235

Feedback Messages 225

TECHNIQUES FOR MACHINE LEARNING BASED PEAK TO AVERAGE POWER RATIO REDUCTION

FIELD OF TECHNOLOGY

The following relates to wireless communications and to techniques for machine learning based peak to average power ratio (PAPR) reduction.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for machine learning based peak to average power ratio (PAPR) reduction. Generally, the described techniques relate to a transmitting device (e.g., user equipment (UE) or base station) using machine leaning to select or adjust a PAPR reduction technique as communication conditions between the transmitting device and a receiving device change to decrease PAPR while increasing a likelihood of receiving a signal at the receiving device (e.g., successfully decoding the signal), among other benefits. For example, a base station may obtain channel knowledge using one or more feedback messages from a UE, analyze the channel knowledge using a machine learning algorithm, and determine a PAPR reduction technique that may maximize the likelihood of receiving a downlink signal at the UE. The base station may modify a downlink signal according to the determined PAPR reduction technique, transmit the modified downlink signal to the UE, and, in some cases, the UE may reconstruct the downlink signal. In some examples, the base station may also generate information indicating the modified downlink signal, for example, using machine learning and transmit the information to the UE to aid in reconstructing (e.g., restoring) the downlink signal. A method for wireless communication at a base station is described. The method may include establishing a communication link with a user equipment (UE), selecting a type of machine learning to be used by the base station for modifying one or more signals, modifying, based on the communication link and the selected type of machine learning, a downlink signal using a signal suppression technique, and transmitting, to the UE over a downlink channel, the modified downlink signal and information indicating the modification of the downlink signal.

An apparatus for wireless communication at a base station is described. The apparatus may include a processor, memory in electronic communication with the processor, and instructions stored in the memory. The instructions may be executable by the processor to cause the apparatus to establish a communication link with a UE, select a type of machine learning to be used by the base station for modifying one or more signals, modifying, based at least in part on the communication link and the selected type of machine learning, a downlink signal using a signal suppression technique, and transmit, to the UE over a downlink channel, the modified downlink signal and information indicating the modification of the downlink signal.

Another apparatus for wireless communication at a base station is described. The apparatus may include means for establishing a communication link with a UE, means for selecting a type of machine learning to be used by the base station for modifying one or more signals, means for modifying, based on the communication link and the selected type of machine learning, a downlink signal using a signal suppression technique, and means for transmitting, to the UE over a downlink channel, the modified downlink signal and information indicating the modification of the downlink signal.

A non-transitory computer-readable medium storing code for wireless communication at a base station is described. The code may include instructions executable by a processor to establish a communication link with a UE, select a type of machine learning to be used by the base station for modifying one or more signals, modifying, based at least in part on the communication link and the selected type of machine learning, a downlink signal using a signal suppression technique, and transmit, to the UE over a downlink channel, the modified downlink signal and information indicating the modification of the downlink signal.

Some examples of the method, apparatuses, and non-transitory computer-readable medium described herein may further include operations, features, means, or instructions for receiving, from the UE, a message indicating a capability to restore the downlink signal, where modifying the downlink signal may be based on receiving the message indicating the capability to restore the downlink signal.

Some examples of the method, apparatuses, and non-transitory computer-readable medium described herein may further include operations, features, means, or instructions for generating the information indicating the modification of the downlink signal based on the communication link and the selected type of machine learning, where transmitting the information indicating the modification of the downlink signal may be based on generating the information.

Some examples of the method, apparatuses, and non-transitory computer-readable medium described herein may further include operations, features, means, or instructions for receiving, from the UE, one or more feedback messages indicating a condition of the downlink channel.

Some examples of the method, apparatuses, and non-transitory computer-readable medium described herein may further include operations, features, means, or instructions for receiving, after receiving the one or more feedback messages, one or more channel state information (CSI) messages indicating a channel condition lower than a threshold, performing the type of machine learning on data samples associated with the one or more signals based on receiving the one or more CSI messages, and modifying the downlink signal using a second signal suppression technique different than the signal suppression technique based on performing the type of machine learning.

Some examples of the method, apparatuses, and non-transitory computer-readable medium described herein may further include operations, features, means, or instructions for receiving, after receiving the one or more feedback messages, one or more negative acknowledgement (NACK) messages, performing the type of machine learning on data samples associated with the one or more signals based on receiving the one or more NACK messages, and modifying the downlink signal using a second signal suppression technique different than the signal suppression technique based on performing the type of machine learning.

Some examples of the method, apparatuses, and non-transitory computer-readable medium described herein may further include operations, features, means, or instructions for selecting the type of machine learning occurs prior to receiving the one or more feedback messages.

In some examples of the method, apparatuses, and non-transitory computer-readable medium described herein, receiving the one or more feedback messages may include operations, features, means, or instructions for receiving at least one of a hybrid automatic repeat request (HARQ) message, a CSI message, a sounding reference signal (SRS), or any combination thereof.

In some examples of the method, apparatuses, and non-transitory computer-readable medium described herein, the CSI message includes at least one of a channel quality indicator (CQI), a rank indicator (RI), a precoder matrix indicator (PMI), a CSI resource indicator (CRI), or any combination thereof.

Some examples of the method, apparatuses, and non-transitory computer-readable medium described herein may further include operations, features, means, or instructions for transmitting, to the UE based on the information indicating the modification of the downlink signal, a message indicating a second type of machine learning for restoring the downlink signal.

In some examples of the method, apparatuses, and non-transitory computer-readable medium described herein, transmitting the message indicating the second type of machine learning may include operations, features, means, or instructions for transmitting an algorithm associated with the second type of machine learning, a number of layers associated with the second type of machine learning, a number of neurons associated with the second type of machine learning, or any combination thereof.

In some examples of the method, apparatuses, and non-transitory computer-readable medium described herein, the algorithm associated with the second type of machine learning includes an artificial neural network (ANN) algorithm, a convolution neural network (CNN) algorithm, or a recurrent neural network (RNN) algorithm, or any combination thereof.

In some examples of the method, apparatuses, and non-transitory computer-readable medium described herein, transmitting the message indicating the second type of machine learning may include operations, features, means, or instructions for transmitting a radio resource control (RRC) message.

In some examples of the method, apparatuses, and non-transitory computer-readable medium described herein, transmitting the information indicating the modification of the downlink signal may include operations, features, means, or instructions for transmitting at least one of a level of clipping, amplitude information, position information, or phase information associated with the modified downlink signal.

In some examples of the method, apparatuses, and non-transitory computer-readable medium described herein, the signal suppression technique may include operations, features, means, or instructions for clipping a peak amplitude of the downlink signal based on a level of clipping; or passing the downlink signal through a filter; or both.

Some examples of the method, apparatuses, and non-transitory computer-readable medium described herein may further include operations, features, means, or instructions for determining the level of clipping based on the selected type of machine learning and the communication link, where modifying the downlink signal using the signal suppression technique may be based on determining the level of clipping.

In some examples of the method, apparatuses, and non-transitory computer-readable medium described herein, the type of machine learning includes supervised learning, unsupervised learning, or reinforcement learning.

A method for wireless communication at a UE is described. The method may include establishing a communication link with a base station, receiving, from the base station over a downlink channel, a downlink signal, information indicating a modification of the downlink signal, and a message indicating a type of machine learning, and restoring the downlink signal based on the indicated type of machine learning and the information indicating the modification of the downlink signal.

An apparatus for wireless communication at a UE is described. The apparatus may include a processor, memory in electronic communication with the processor, and instructions stored in the memory. The instructions may be executable by the processor to cause the apparatus to establish a communication link with a base station, receive, from the base station over a downlink channel, a downlink signal, information indicating a modification of the downlink signal, and a message indicating a type of machine learning, and restore the downlink signal based on the indicated type of machine learning and the information indicating the modification of the downlink signal.

Another apparatus for wireless communication at a UE is described. The apparatus may include means for establishing a communication link with a base station, means for receiving, from the base station over a downlink channel, a downlink signal, information indicating a modification of the downlink signal, and a message indicating a type of machine learning, and means for restoring the downlink signal based on the indicated type of machine learning and the information indicating the modification of the downlink signal.

A non-transitory computer-readable medium storing code for wireless communication at a UE is described. The code may include instructions executable by a processor to establish a communication link with a base station, receive, from the base station over a downlink channel, a downlink signal, information indicating a modification of the downlink signal, and a message indicating a type of machine learning, and restore the downlink signal based on the indicated type of machine learning and the information indicating the modification of the downlink signal.

Some examples of the method, apparatuses, and non-transitory computer-readable medium described herein may further include operations, features, means, or instructions for transmitting, to the base station, a message indicating a capability to restore the downlink signal, where restoring the downlink signal may be based on transmitting the message indicating the capability to restore the downlink signal.

Some examples of the method, apparatuses, and non-transitory computer-readable medium described herein may further include operations, features, means, or instructions for transmitting, to the base station, one or more feedback messages indicating a condition of the downlink channel.

In some examples of the method, apparatuses, and non-transitory computer-readable medium described herein, transmitting the one or more feedback messages may include operations, features, means, or instructions for transmitting at least one of a HARQ message, a CSI message, an SRS, or any combination thereof.

In some examples of the method, apparatuses, and non-transitory computer-readable medium described herein, the CSI message includes a CQI, an RI, a PMI, a CRI, or any combination thereof.

In some examples of the method, apparatuses, and non-transitory computer-readable medium described herein, receiving the message indicating the type of machine learning may include operations, features, means, or instructions for receiving an algorithm associated with the type of machine learning, a number of layers associated with the type of machine learning, a number of neurons associated with the type of machine learning, or any combination thereof.

In some examples of the method, apparatuses, and non-transitory computer-readable medium described herein, the algorithm includes an ANN algorithm, a CNN algorithm, or an RNN algorithm.

In some examples of the method, apparatuses, and non-transitory computer-readable medium described herein, receiving the message indicating the type of machine learning may include operations, features, means, or instructions for receiving an RRC message.

In some examples of the method, apparatuses, and non-transitory computer-readable medium described herein, the information indicating the modification of the downlink signal includes at least one of a level of clipping, amplitude information, position information, or phase information associated with the downlink signal.

Some examples of the method, apparatuses, and non-transitory computer-readable medium described herein may further include operations, features, means, or instructions for receiving the message indicating the type of machine learning occurs before receiving the downlink signal and information indicating the modification of the downlink signal.

Some examples of the method, apparatuses, and non-transitory computer-readable medium described herein may further include operations, features, means, or instructions for receiving, from the base station, a message indicating a second type of machine learning for restoring the downlink signal, where restoring the downlink signal may be based on receiving the message.

DETAILED DESCRIPTION

Figure 1:
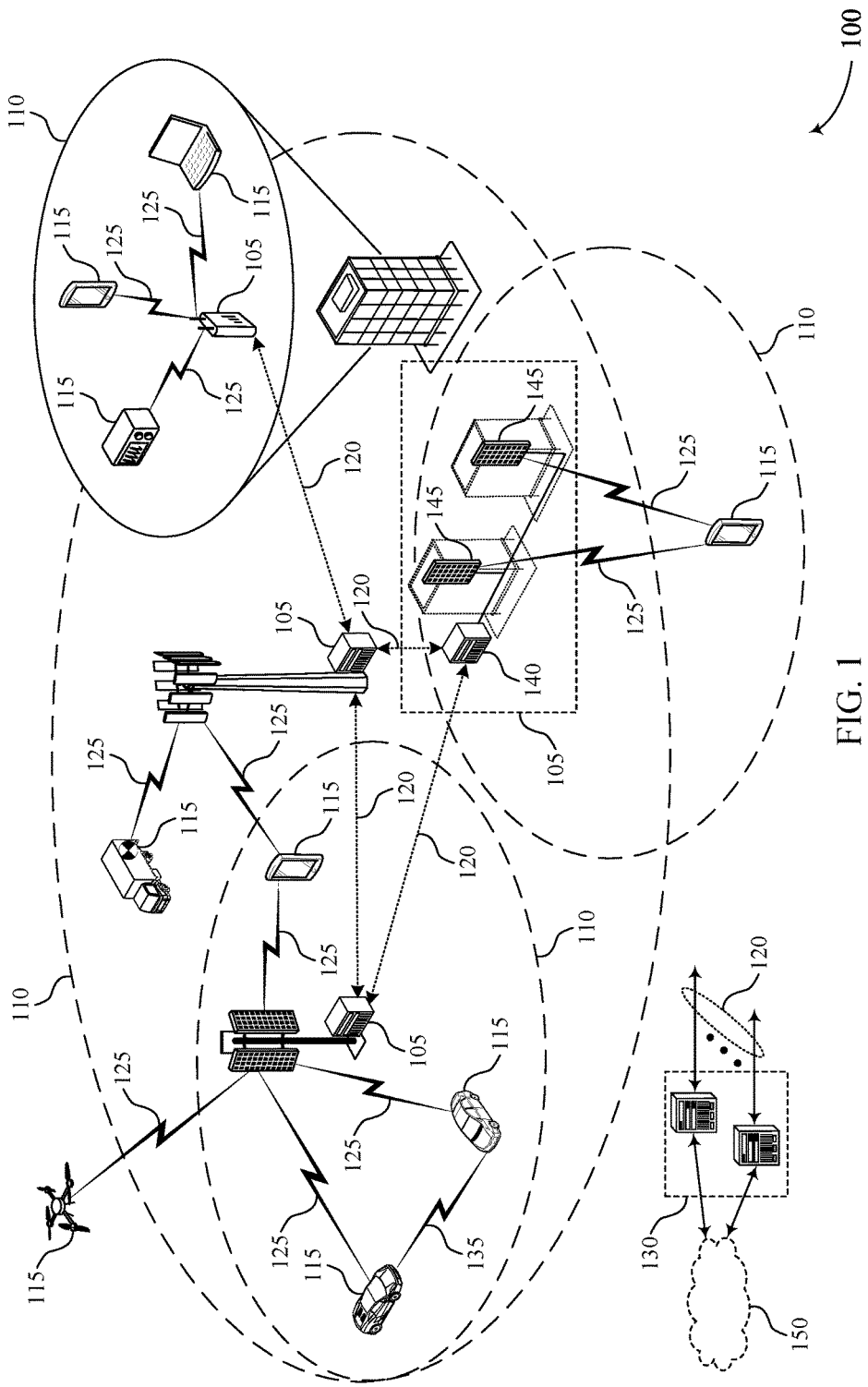
FIGS. 1 and 2 illustrate examples of a wireless communications system that supports techniques for machine learning based PAPR reduction in accordance with aspects of the present disclosure.

Some wireless communications system may support orthogonal frequency division multiple access (OFDMA) techniques, among others, which may allow multiple user equipment (UEs) to communicate concurrently via resource units (RUs), where each RU may correspond to a set of subcarriers. In some cases, utilizing OFDMA may result in a relatively higher peak to average power ratio (PAPR) when compared to single carrier methods, among other issues. PAPR may be described as the ratio of the maximum power of a sample in a given OFDM symbol to the average power of the OFDM symbol. In some cases, a higher PAPR may result in increased power consumption and decreased efficiency. For example, to accommodate a higher PAPR, using other different techniques, a power amplifier with a higher saturation point than the average power may be selected and as such, a large back off (BO) may be applied for most transmissions. As PAPR increases, the applied BO may also increase. However, operating with a large BO may increase power consumption at the power amplifier, among other components, and may also degrade the power amplifier over time. As such, methods of PAPR reduction have been developed. Methods of PAPR reduction may include hard clipping the signal, hard clipping the sample and sending side information for reconstruction of the signal at a receiving device, or filtered clipping, among others. In other different systems, a transmitting device may select one method of PAPR reduction and utilize the one method of PAPR reduction throughout communication with a receiving device. However, communication conditions between the receiving device and the transmitting device may change and the selected method of PAPR reduction may no longer be applicable, or may no longer be efficient, or both.

Some wireless communications systems may utilize machine learning to adapt or select a PAPR reduction technique as communication conditions change to reduce PAPR while increasing reliability. For example, a UE may establish a connection with a base station. The UE may transmit one or more feedback messages to the base station that may, for example, relate to the condition of a downlink channel. For example, the UE may transmit one or more channel state information (CSI) messages or hybrid automatic repeat request (HARQ) messages. The base station may receive the one or more feedback messages, utilize machine learning techniques to modify a downlink signal in an effort to reduce PAPR, and generate information (also referred to as "side information") associated with the modified signal (e.g., additional information that is about the signal, but is different from the signal itself). In some examples, the base station may not utilize information obtained from the one or more feedback messages when performing the machine learning techniques, but instead may use information already known to the base station (e.g., a frequency used to communicate with the UE or quadrature amplitude modulation (QAM) format). Some types of machine learning the base station may utilize may include unsupervised learning, supervised learning, or reinforcement learning. The base station may then transmit the modified downlink signal to the UE along with the information and the UE may utilize the information to reconstruct (e.g., or restore) the downlink signal. In some examples, the UE may transmit a capability message indicating its ability to reconstruct the downlink signal. Additionally or alternatively, the base station may transmit a message defining a type of machine learning to the UE and the UE may utilize the type of the machine learning indicated in the message to reconstruct the downlink signal. Overall, one or both of the base station or the UE may use machine learning (e.g., Artificial Intelligence) to reduce PAPR of a downlink signal, among other advantages.

Aspects of the disclosure are initially described in the context of wireless communications systems. Additional aspects are described in the context of process flows. Aspects of the disclosure are further illustrated by and described with reference to apparatus diagrams, system diagrams, and flowcharts that relate to techniques for machine learning based PAPR reduction.

FIG. 1 illustrates an example of a wireless communications system 100 that supports techniques for machine learning based PAPR reduction in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to any combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$)
and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or any combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. HARQ feedback is one technique for increasing the likelihood that data is received correctly over a communication link 125. HARQ may include any combination of error detection (e.g., using a cyclic redundancy check (CRC)), forward error correction (FEC), and retransmission (e.g., automatic repeat request (ARQ)). HARQ may improve throughput at the media access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a transmitting device (e.g., a UE 115, a base station 105) may utilize machine learning to select or adjust a PAPR reduction technique as communication conditions between the transmitting device and a receiving device changes to decrease PAPR while increasing a likelihood of receiving a signal at the receiving device. For example, a base station 105 may obtain channel knowledge from one or more feedback messages, analyze the channel knowledge using a machine learning algorithm, and determine the PAPR reduction technique that may provide an increased or a best opportunity for receiving (e.g., may maximize reception of) a downlink signal to a UE 115. The base station 105 may modify a downlink signal according to the PAPR reduction technique and transmit the modified signal to the UE 115, where the UE 115 may reconstruct the downlink signal. In some examples, the base station 105 may also generate information indicating the modified downlink signal using machine learning (or without using machine learning) and transmit the information to the UE 115 to aid in the reconstruction of the downlink signal.

Figure 2:
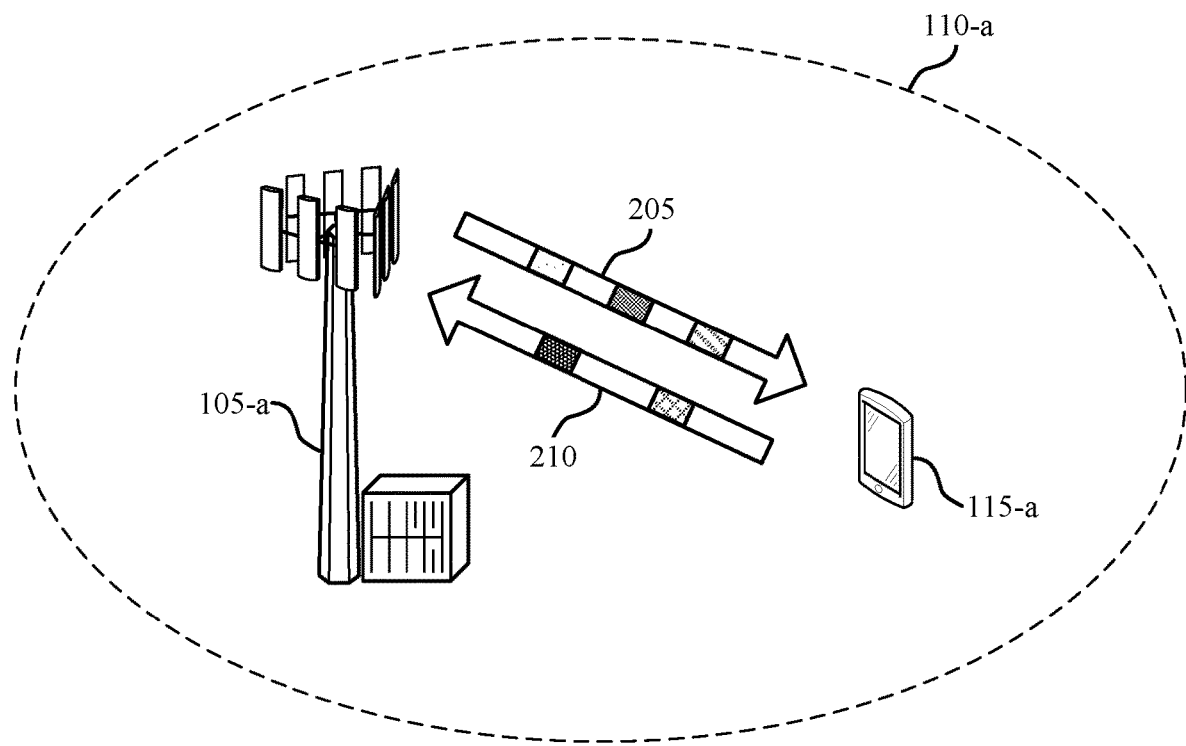
Figure 2:
Figure 2:
Figure 2:
Figure 2:
Figure 2:

FIG. 2 illustrates an example of a wireless communications system 200 that supports techniques for machine learning based PAPR reduction in accordance with aspects of the present disclosure. In some examples, the wireless communications system 200 may implement or may be implemented by aspects of a wireless communications system 100. For example, the wireless communications system 200 may include a base station 105-a and a UE 115-a which may be examples of a base station 105 and a UE 115 with reference to FIG. 1. In some examples, the base station 105-a may be an example of a transmitting device and the UE 115-a may be an example of a receiving device. Alternatively, the UE 115-a may be an example of a transmitting device and the base station 105-a may be an example of a receiving device. The base station 105-a and the UE 115-a may be located within coverage area 110-a.

In some cases, the base station 105-a may establish a connection and communicate with the UE 115-a. The base station 105-a and UE 115-a may communicate with one another using downlink signals 205 and uplink signals 210. In some examples, the wireless communications system 200 may support an OFDMA scheme. The OFDMA scheme may allow multiple users to transmit concurrently or simultaneously by assigning each user a different sub-set of subcarriers or resource units (RUs). In some cases, OFDMA may result in increased PAPR relative to other different techniques. Increased PAPR may occur when different subcarriers are out-of-phase with one another and may be defined as a ratio of the maximum power of a sample in a given OFDM symbol to the average power of the OFDM symbol.

In some examples, the wireless communications system 200 may utilize quadrature amplitude modulation (QAM), among other examples. QAM may be described as a type of digital modulation where two amplitude-modulated (e.g., modulated by amplitude-shift keying (ASK) or amplitude modulation (AM)) signals are transmitted over the same carrier wave (e.g., same frequency). A receiving device (e.g., UE 115-a or base station 105-a) may separate both signals based on the type of amplitude-modulation applied to each signal and extract the data from each signal. In some cases, constellation diagrams may be useful for QAM techniques. A constellation diagram may be defined as a graphical representation of a modulated symbol and may assist a receiving device in determining a symbol value in the presence of noise or distortion. Some example QAM formats are 16 QAM, 64 QAM, 256 QAM, 1024 QAM, etc. As the QAM format increases in size, the number of bits per symbols may increase. For example, a 16 QAM format may allow for four bits per symbol and a 64 QAM format may allow for eight bits per symbol. Although higher QAM formats may result in higher bit rates, constellation points of higher QAM formats are closer together which, in some cases, may hinder a receiving device's ability to differentiate between constellation points in the presence of noise, or distortion, or both. As such, higher constellations (e.g., 256 QAM, 1,024 QAM, and 16,000 QAM) may perform better when error vector magnitude (EVM) is reduced. EVM may be the measure of performance of a transmitting device or a receiving device. To achieve an adequate EVM in situations with relatively higher PAPR (e.g., using OFDMA), a large power BO may be applied when transmitting a signal. But operating with a large power BO, may increase power consumption and incur component damage at the transmitting device or more specifically, a power amplifier of the transmitting device, among other disadvantages.

In some examples, the wireless communications system 200 may support various PAPR reduction techniques (which may also be known as signal suppression techniques). For example, aspects of the current disclosure may allow for the wireless communications system 200 to employ one or more PAPR reduction techniques based on, for example, one or more communication conditions between a transmitting device and a receiving device. A transmitting device (e.g., base station 105) may modify a downlink signal using the one or more PAPR reduction techniques and transmit the modified signal 215 to the receiving device (e.g., UE 115-*a*) and, in some examples, the receiving device may be configured to restore the original downlink signal. In one example, the one or more PAPR reduction techniques may include hard clipping a peak amplitude of the downlink signal based on a level of clipping resulting in a signal with sharp corners, where the level of clipping may refer to an amount of frequency by which the peak amplitude is clipped. Although hard clipping may reduce PAPR, it may come at the expense of EVM as well as an adjacent channel leakage ratio (ACLR) and an in-band emission (IBE). In another example, the one or more PAPR reduction techniques may include hard clipping the downlink signal and generating information 220 indicating characteristics of the modified downlink signal (e.g., amplitude information, position information, or phase information). In some examples, the base station 105-*a* may transmit the information 220 to the UE 115-*a* such that UE 115-*a* may reconstruct the downlink signal. Hard clipping and transmitting the information 220 may reduce PAPR and restore EVM, however it may not restore ACLR and IBE. In yet another example, the one or more PAPR reductions techniques may include hard clipping the downlink signal and passing the clipped downlink signal through a filter (e.g., low-pass filter). Passing the clipped downlink signal through the filter may help reduce the high frequency signals that correspond to the sharp corners in the clipped downlink signal which may restore ACLR and IBE, but may do very little to mitigate EVM and may also increase PAPR. In another example, the one or more PAPR reduction techniques may include soft clipping the downlink signal. Soft clipping may be similar to hard clipping in the sense that the peak amplitude is clipped off, but in soft clipping the tops are still somewhat rounded which may reduce PAPR when compared to hard clipping and restore ACLR and IBE, but may not mitigate EVM. In other different techniques (different from those of the current disclosure), the base station 105-*a* may select a single PAPR reduction technique (e.g., hard clipping, hard clipping and generating information 220, or hard clipping and filtering) and utilize the single PAPR reduction technique throughout communication with the UE 115-*a*. However, communication conditions with UE 115-*a* may change with time (e.g., channel conditions or BWP switch) and the initially selected PAPR reduction technique may not be applicable to the changing communication conditions. For example, ACLR constraints may change as operating frequency changes and EVM constraints may change as modulation schemes or formats change.

In some examples of the present disclosure, a transmitting device may utilize machine learning to select or adjust a PAPR reduction technique in such a way as to increase a likelihood of receiving a signal at a receiving device (e.g., UE 115-*a*) as channel conditions change. For example, a transmitting device (e.g., base station 105-*a*) may determine to hard clip the downlink signal, hard clip the downlink signal and generate information 220, or hard clip and filter the downlink signal based on machine learning techniques. Alternatively or additionally, the base station 105-*a* may adjust an initially selected PAPR reduction technique from using a first PAPR reduction technique to a second PAPR reduction technique based on machine learning techniques. For example, the base station 105-*a* may initially hard clip a downlink signal according to a first level of clipping, then perform machine learning (to analyze communication conditions between the UE 115-*a* and the base station 105-*a*), and determine to hard clip a downlink signal according to a second level of clipping. The first level of clipping may be larger or smaller in terms of an amount of frequency that is clipped than the second level of clipping. In another example, the base station may utilize machine learning techniques to generate information 220. For example, the base station 105-*a* may initially generate information 220 including amplitude information about the modified signal 215, perform machine learning (to analyze communication conditions between the UE 115-*a* and the base station 105-*a*) and determine to generate information 220 including phase information about the modified signal 215.

A machine learning algorithm may be configured (e.g., trained) to increase reception of a signal at a receiving device while reducing PAPR as channel conditions change. As such, a transmitting device (e.g., base station 105-*a*) may analyze a data set related to communication (e.g., communication conditions) with a receiving device (e.g., UE 115-*a*) using a machine learning algorithm (e.g., CNN, RNN, or ANN) to select or adjust a PAPR technique, or generate information 220, or both, among other operations. For example, the base station 105-*a* may use machine learning to analyze various types of data, such as that related to a type of modulation scheme used to communicate with the UE 115-*a* (e.g., 16 QAM or 256 QAM), a condition of a channel used to communicate with the UE 115-*a*, a frequency used to communicate with a UE 115-*a*, the decoding outcome of a signal at UE 115-*a* (e.g., successful or unsuccessful), or any combination thereof and output, based on the machine learning analysis, an adjustment to a PAPR technique or to a select new PAPR technique which may increase reliability (e.g., promote ACLR and IBE or reduce EVM). The condition of the channel and the decoding outcome may be determined at the base station 105-*a* based on one or more feedback messages 225 (e.g., CSI message, sounding reference signal (SRS), or acknowledgement (ACK)/negative acknowledgment (NACK) messages) received from the UE 115-*a*. The CSI may include a rank indicator (RI), a precoder matrix indicator (PMI), a channel quality indicator (CQI), or a CSI-reference signal (RS) resource indicator (CRI), or any combination thereof, among other examples. In one example, the base station 105-*a* may initially utilize a 16 QAM format to communicate with the UE 115-*a* and modify a first downlink signal by hard clipping the sample according to a first level of clipping. In some examples, the base station 105-*a* may switch from the 16 QAM format to a 256 QAM format and modify a second downlink signal using the same hard clipping technique or another technique. In some cases, the base station 105-*a* may receive one or more NACKs from the UE 115-*a* indicating an unsuccessful decoding outcome of the second modified signal 215. The base station 105-*a* may input information related to communication with the UE 115-*a* (e.g., modulation format, decoding outcome, etc.) into the machine learning algorithm (e.g., may analyze the information related to communication with the UE 115-*a* using the machine learning algorithm) and determine to adjust the level of clipping by which the downlink signal is clipped (e.g., second level of clipping) or select a different PAPR reduction technique (e.g., hard clipping and generating information 220) and transmit a third modified signal 215 to the UE 115-*a*. After performing this process one or more times, the base station 105-*a* may converge at (e.g., select, adjust) a PAPR reduction technique that may increase reception of the signal for a specified channel condition or scenario. For example, the machine learning algorithm may learn that EVM constraints for higher modulation formats (e.g., 256 QAM) may be more stringent than lower modulation formats (e.g., 16 QAM) or that ACLR and IBE constrains for lower frequency bands (e.g., FR1) are more stringent than higher frequency bands (e.g., FR2) and choose a PAPR reduction technique accordingly.

The transmitting device (e.g., base station 105-*a*) may utilize one or more types of machine learning as described herein. The one or more types of machine learning may include supervised learning, unsupervised learning, or reinforcement learning. In supervised learning, input data may be mapped to output labels to indicate to a base station 105-*a* what pattern to look for. In unsupervised learning, the input data may not be mapped to output labels and the base station 105-*a* may deduce a pattern by categorizing the input and output data into different groups. In reinforcement learning, the base station 105-*a* may utilize trial and error to deduce the pattern. The transmitting device (e.g., base station 105-*a*) may utilize one or more of these types of machine learning along with the machine learning algorithm discussed herein to adjust or select a PAPR reduction technique while accounting for changing communication conditions (e.g., channel conditions, decoding outcomes).

In some examples, the receiving device (e.g., UE 115-*a*) may indicate a type of reconstruction that it may perform to restore the original downlink signal from modified signal 215. For example, the UE 115-*a* may transmit capability message 230 to the base station 105-*a*. In some cases, the capability message 230 may include a one-bit indication or a multi-bit indication that indicates that UE 115-*a*'s capability to restore the original downlink signal from modified signal 215 using one or more techniques. The base station 105-*a* may, in some examples, modify the downlink signal or generate information 220 based on the capability message 230. In some examples, however, the UE 115-*a* may be unable to restore the downlink signal (e.g., UE 115-*a* may be a low capability UE). As such, the capability message 230 may indicate the UE 115-*a* is unable to restore a modified signal 215 using one or more techniques, and the base station 105-*a* may determine to not modify the downlink signal based on the capability message 230 indicating that the UE 115-*a* is unable to restore a modified signal 215 using one or more techniques.

In some cases, the receiving device (e.g., UE 115-*a*) may utilize machine learning to restore the modified signal 215. In such case, the UE 115-*a* may receive a machine learning indication 235, for example, from the transmitting device such as from the base station 105-*a*. The machine learning indication 235 may inform the UE 115-*a* of which type of machine learning to use to restore the downlink signal. For example, the machine learning indication may include an indication of a technique to be implemented by the UE 115-*a*, for example, an indication of a machine learning algorithm (e.g., an artificial neural network (ANN) algorithm, a convolution neural network (CNN) algorithm, or a recurrent neural network (RNN)), a number of layers, a number of neurons, or any combination thereof. The function of a neuron may be to provide an output by applying an activation function (e.g., step, date, sigmoid, etc.). A collection of neurons may be known as a layer (e.g., input layer, output layer, or hidden layer). Each machine learning algorithm may have a different amount of neurons or layers. As such, the number of layers or the number neurons may help define a machine learning algorithm.

Figure 3:
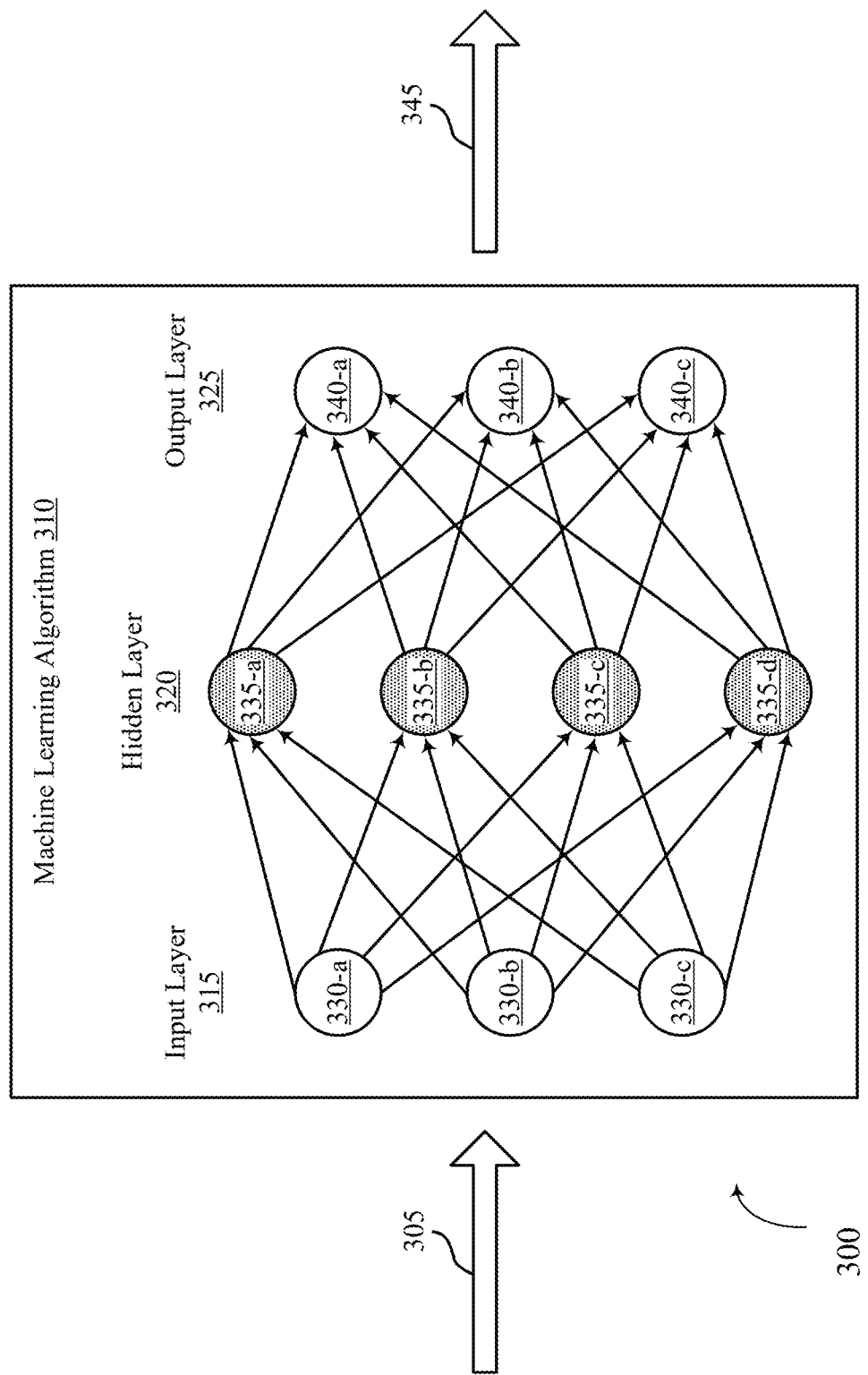
FIG. 3 illustrates an example of a machine learning process that supports techniques for machine learning based PAPR reduction in accordance with aspects of the present disclosure.

FIG. 3 illustrates an example of a machine learning process 300 that supports techniques for machine learning based PAPR reduction in accordance with aspects of the present disclosure. The machine learning process 300 may be implemented at a base station or a UE as described with reference to FIGS. 1 and 2. The machine learning process 300 may include performing or implementing a machine learning algorithm 310. In some examples, the base station may implement machine learning algorithm 310 to adjust a PAPR reduction technique (e.g., from a first technique to a second different technique) or select a PAPR reduction technique (e.g., a new PAPR reduction technique). In some examples, a UE may implement machine learning algorithm 310 to restore a downlink signal modified by the base station.

As described with reference to FIG. 2, the machine learning algorithm 310 may be implemented at a transmitting device (e.g., a base station) to adjust a PAPR reduction technique or select a PAPR reduction technique. In some examples, the base station may send a set of input data 305 to the machine learning algorithm 310 for processing. The set of input data 305 may be associated with communication between the base station and a UE (e.g., communication conditions). For example, the set of input data 305 may be data associated with a type of modulation scheme used to communicate with the UE, a condition of a channel used to communicate with the UE, a frequency used to communicate with the UE, a decoding outcome of a signal at the UE, the UE's capability, or any combination thereof. In some examples, the machine learning algorithm 310 may be configured to process the set of input data 305 and determine a set of output data 345. The set of output data 345 may be a PAPR reduction technique different from another (e.g., the most recently used PAPR reduction technique) or an adjustment to another (e.g., the most recently used, PAPR reduction technique) which may improve the reliability of reception of a signal at a receiving device (e.g., UE). Another potential output may include an adjustment to the modulation format which improves the reliability of reception of a signal at the receiving device (e.g., UE). That is, a modulation scheme different from another modulation scheme (e.g., the most recently used modulation scheme, changing from 256 QAM to 64 QAM).

As described with reference to FIG. 2, the machine learning algorithm 310 may be implemented at a receiving device (e.g., a UE) to determine how to restore the downlink signal based on a modified signal transmitted from a transmitting device (e.g., a base station). In some examples, the UE may send a set of input data 305 to the machine learning algorithm 310 for processing. The set of input data 305 may be associated with information indicating the modified downlink signal received from the base station, a capability of the UE, the decoding outcome of a signal received at the UE, etc. For example, the set of input data may be associated with an amplitude of the downlink signal, a location of the downlink signal, or phase of the signal, etc. In some examples, the machine learning algorithm 310 may process the set of input data 305 and determine a set of output data 345. The set of output data 345 may be a restoration technique. That is, a way in which the UE reconstructs the original signal from the base station.

As illustrated, the machine learning algorithm 310 may be an example of a neural net, such as a feed forward (FF) or deep feed forward (DFF) neural network, an RNN, a long/short term memory (LSTM) neural network, or any other type of neural network, or any combination thereof. However, any other machine learning algorithms may be supported by the UE and the base station. For example, the machine learning algorithm 310 may implement a nearest neighbor algorithm, a linear regression algorithm, a Naïve Bayes algorithm, a random forest algorithm, or any other machine learning algorithm, or any combination thereof. Furthermore, the machine learning process 300 may additionally or alternatively involve supervised learning, unsupervised learning, semi-supervised learning, reinforcement learning, or any combination thereof.

The machine learning algorithm 310 performed at or by one or more components may include an input layer 315, one or more hidden layers 320, and an output layer 325. In a fully connected neural network with one hidden layer 320, each hidden layer node 335 may receive a value from each input layer node 330 as input, where each input is weighted. These neural network weights may be based on a cost function that may be revised during training of the machine learning algorithm 310. Similarly, each output layer node 340 may receive a value from each hidden layer node 335 as input, where the inputs are weighted. If post-deployment training (e.g., online training) is supported at a UE or a base station, the UE or base station may allocate memory to store errors or gradients (or both) for reverse matrix multiplication. These errors or gradients (or both) may support updating the machine learning algorithm 310 based on output feedback. Training the machine learning algorithm 310 may support computation of the weights (e.g., connecting the input layer nodes 330 to the hidden layer nodes 335 and the hidden layer nodes 335 to the output layer nodes 340) to map an input pattern to a desired output outcome.

The UE or base station may send the set of input data 305 to the machine learning algorithm 310 for processing. The set of input data 305 may be converted into a set of k input layer nodes 330 at the input layer 315. In some cases, different measurements may be input at different input layer nodes 330 of the input layer 315. Some input layer nodes 330 may be assigned default values (e.g., values of 0) if the number of input layer nodes 330 exceeds the number of inputs corresponding to the set of input data 305. As illustrated, the input layer 315 may include three input layer nodes 330-a, 330-b, and 330-c. However, it is to be understood that the input layer 315 may include any number of input layer nodes 330 (e.g., 20 input nodes).

The machine learning algorithm 310 may convert the input layer 315 to a hidden layer 320 based on a number of input-to-hidden weights between the k input layer nodes 330 and the n hidden layer nodes 335. The machine learning algorithm 310 may include any number of hidden layers 320 as intermediate steps between the input layer 315 and the output layer 325. Additionally, each hidden layer 320 may include any number of nodes. For example, as illustrated, the hidden layer 320 may include four hidden layer nodes 335-a, 335-b, 335-c, and 335-d. However, it is to be understood that the hidden layer 320 may include any number of hidden layer nodes 335 (e.g., 10 input nodes). In a fully connected neural network, each node in a layer may be based on each node in the previous layer. For example, the value of hidden layer node 335-a may be based on the values of input layer nodes 330-a, 330-b, and 330-c (e.g., with different weights applied to each node value).

The machine learning algorithm 310 may determine values for the output layer nodes 340 of the output layer 325 following one or more hidden layers 320. For example, the machine learning algorithm 310 may convert the hidden layer 320 to the output layer 325 based on a number of hidden-to-output weights between the n hidden layer nodes 335 and the m output layer nodes 340. In some cases, n=m. Each output layer node 340 may correspond to a different output value 345 of the machine learning algorithm 310. As illustrated, the machine learning algorithm 310 may include three output layer nodes 340-a, 340-b, and 340-c, supporting three different threshold values. However, it is to be understood that the output layer 325 may include any number of output layer nodes 340. The values determined by the machine learning algorithm 310 for the output layer nodes 340 may correspond to probabilities or other metrics that the base station or the UE may use for PAPR reduction.

As described herein, the transmitting device (e.g., a base station) may utilize machine learning to selected or adapt a PAPR reduction technique based on changing communication conditions. That is, a base station may analyze communication conditions related to communication with a UE using a machine learning process (e.g., a type of machine learning and a machine learning algorithm) to selected or adapt a PAPR reduction technique. In some examples, the PAPR reduction technique may be adapted or selected in such a way as to increase reliability of receiving a downlink signal at a receiving device (e.g., a UE). The base station may modify a downlink signal according to the selected or adapted PAPR reduction technique and transmit the modified downlink signal to the UE, where the UE may reconstruct the original downlink signal.

Figure 4:
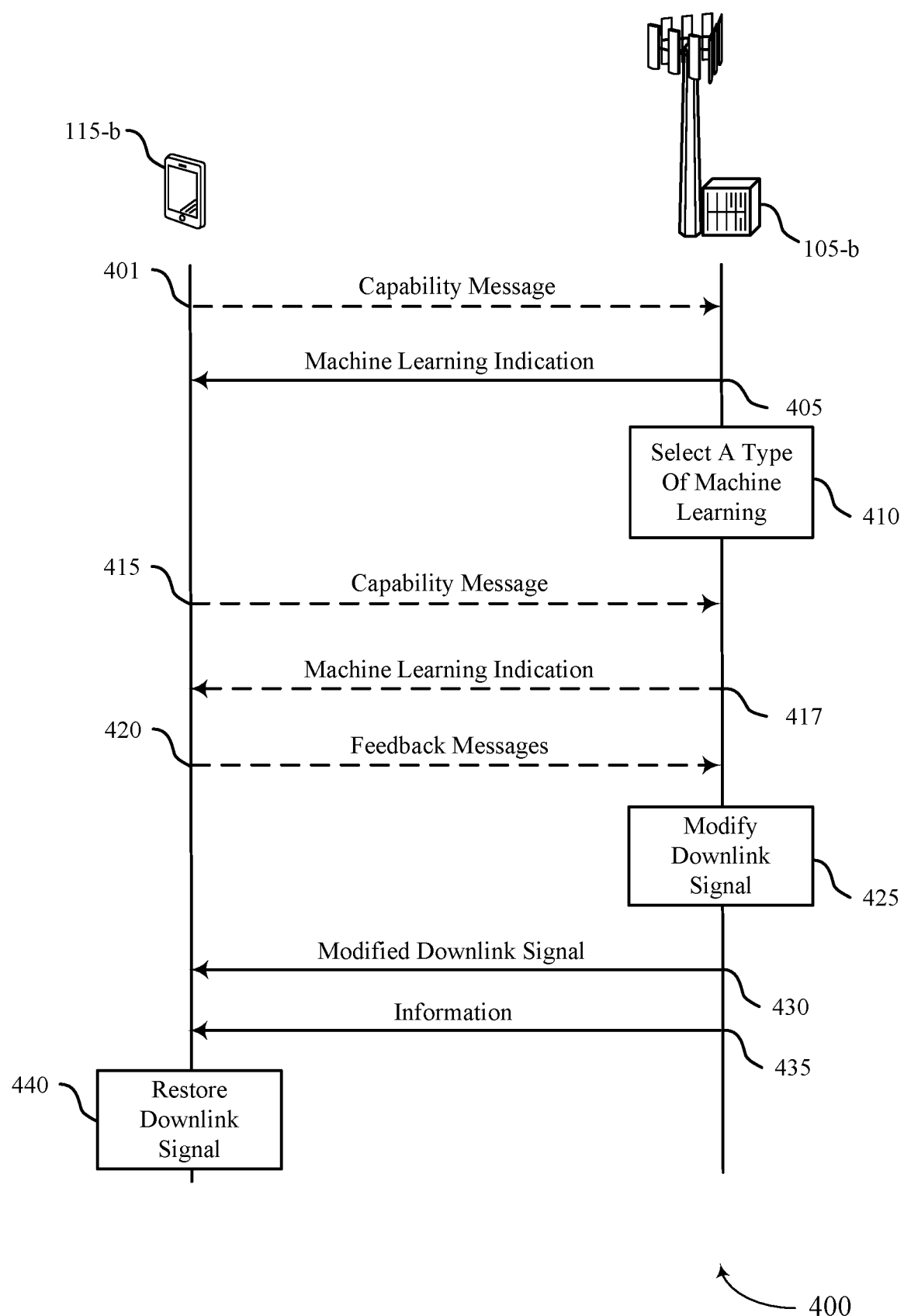
FIG. 4 illustrates an example of a process flow that supports techniques for machine learning based PAPR reduction in accordance with aspects of the present disclosure.

FIG. 4 illustrates an example of a process flow 400 that supports techniques for machine learning based PAPR reduction in accordance with aspects of the present disclosure. In some examples, process flow 400 may implement or may be implemented by aspects of a wireless communications system 100, a wireless communications system 200, and a machine learning process 300. The process flow 400 may involve a base station 105-b or a UE 115-b (or both) utilizing machine learning to modify or process a signal in order to reduce PAPR. Alternative examples of the following may be implemented, where some steps are performed in a different order than described or are not performed at all. In some cases, steps may include additional features not mentioned below, or further steps may be added.

At 401, the base station 105-b may potentially receive a capability message from the UE 115-b. The capability message may convey to the base station 105-b which type of signal reconstruction technique the UE 115-b may use to reconstruct a signal from the base station 105-b. In some examples, the capability message may be conveyed to the base station 105-b in the form of a capability bit. In some examples, the UE 115-b may indicate, via the capability message, that the UE 115-b is unable to reconstruct a signal from the base station 105-b. In some examples, if the base station 105-b does not receive the capability message from the UE 115-b at 401, the base station 105-b may receive the capability message later in the process. For example, the base station 105-b may receive the capability message at 415.

At 405, the base station 105-b may potentially transmit a machine learning indication to the UE 115-b. The machine learning indication may indicate a machine learning process to utilize for downlink signal reconstruction. In some examples, the machine learning indication may include a machine learning algorithm (e.g., CNN, RNN, or ANN), a number of layers, a number of neurons, etc. associated with the machine learning process. In some cases, the UE 115-b may receive the machine learning indicator via a radio resource control (RRC) message.

At 410, the base station 105-b may select a type of machine learning (e.g., unsupervised learning, supervised learning, semi-supervised learning, or reinforcement learning). The base station 105-b may use the selected type of machine learning to adapt or select a PAPR reduction technique for modification of a downlink signal and to generate information related to the modified signal which the UE 115-b may use to restore the signal. In some examples, a machine learning algorithm of the selected type of machine learning may be trained to select or adapt a PAPR reduction technique in such a way as to increase reception of a signal at the UE 115-b as channel conditions change. Depending on the conditions of the channel, increasing reception of a signal may include increasing or decreasing ACLR and IBE, or increasing or decreasing EVM, or some combination.

At 415, the base station 105-b may potentially receive a capability message from the UE 115-b. The capability message may convey to the base station 105-b which type of signal reconstruction technique the UE 115-b may use to reconstruct a signal from the base station 105-b. In some examples, the capability message may be conveyed to the base station 105-b in the form of a capability bit. In some examples, the UE 115-b may indicate, via the capability message, that the UE 115-b is unable to reconstruct a signal from the base station 105-b. If the base station 105-b received the capability message at 401, the capability message may not be received at 415.

At 417, the base station 105-b may potentially transmit a machine learning indication to the UE 115-b. The machine learning indication may indicate a machine learning process to utilize for downlink signal reconstruction. In some examples, the machine learning indication may include a machine learning algorithm (e.g., CNN, RNN, or ANN), a number of layers, a number of neurons, etc. associated with the machine learning process. In some cases, the UE 115-b may receive the machine learning indicator via an RRC message.

At 420, the base station may potentially receive one or more feedback messages. The one or more feedback messages may include CSI messages, HARQ messages (e.g., ACK/NACK messages), SRS, etc. In some examples, the base station 105-b may utilize the one or more feedback messages to determine a condition of a channel or a decoding outcome of a signal received at the UE 115-b. In some example, the base station may not receive one or more feedback message.

At 425, the base station 105-b may modify a downlink signal. In some examples, the base station 105-b may modify the downlink signal according to a PAPR reduction technique. For example, the base station 105-b may determine to hard clip the downlink signal, hard clip the downlink signal and generate information, or hard clip and filter the downlink. In some cases, the base station 105-b may utilize the type of machine learning selected at 410 to determine the PAPR reduction technique. The base station 105-b may also generate information related to the modified downlink signal based on the selected type of machine learning.

At 430, the base station 105-b may transmit a modified downlink signal to the UE 115-b. At 435, the base station 105-b may transmit information indicating the modified downlink signal to the UE 115-b. In some examples, the information indicating the modified downlink channel may include amplitude information, phase information, or location information associated with the modified downlink signal (e.g., peak suppression information message (PSIM)), or any combination thereof.

At 440, the UE 115-b may restore the downlink signal. In some examples, the UE 115-b may utilize the information received at 440 to restore the downlink signal. Additionally or alternatively, the UE 115-b may use the machine learning indicated by the machine learning indication received at 405 to restore the downlink signal.

Overall, implementing this process may allow the system (e.g., UE 115-b, base station 105-b) to reduce PAPR. In addition, this process may increase the likelihood of a successful decoding outcome at a receiving device (e.g., UE 115-b) by accounting for changing communication conditions when modifying a signal (via the PAPR reduction technique) and by enabling machine learning at the receiving device. Moreover, this process may allow for a modified downlink signal which meets the ACLR and IBE requirements of the current communication conditions (e.g., conditions of the channel).

Figure 5:
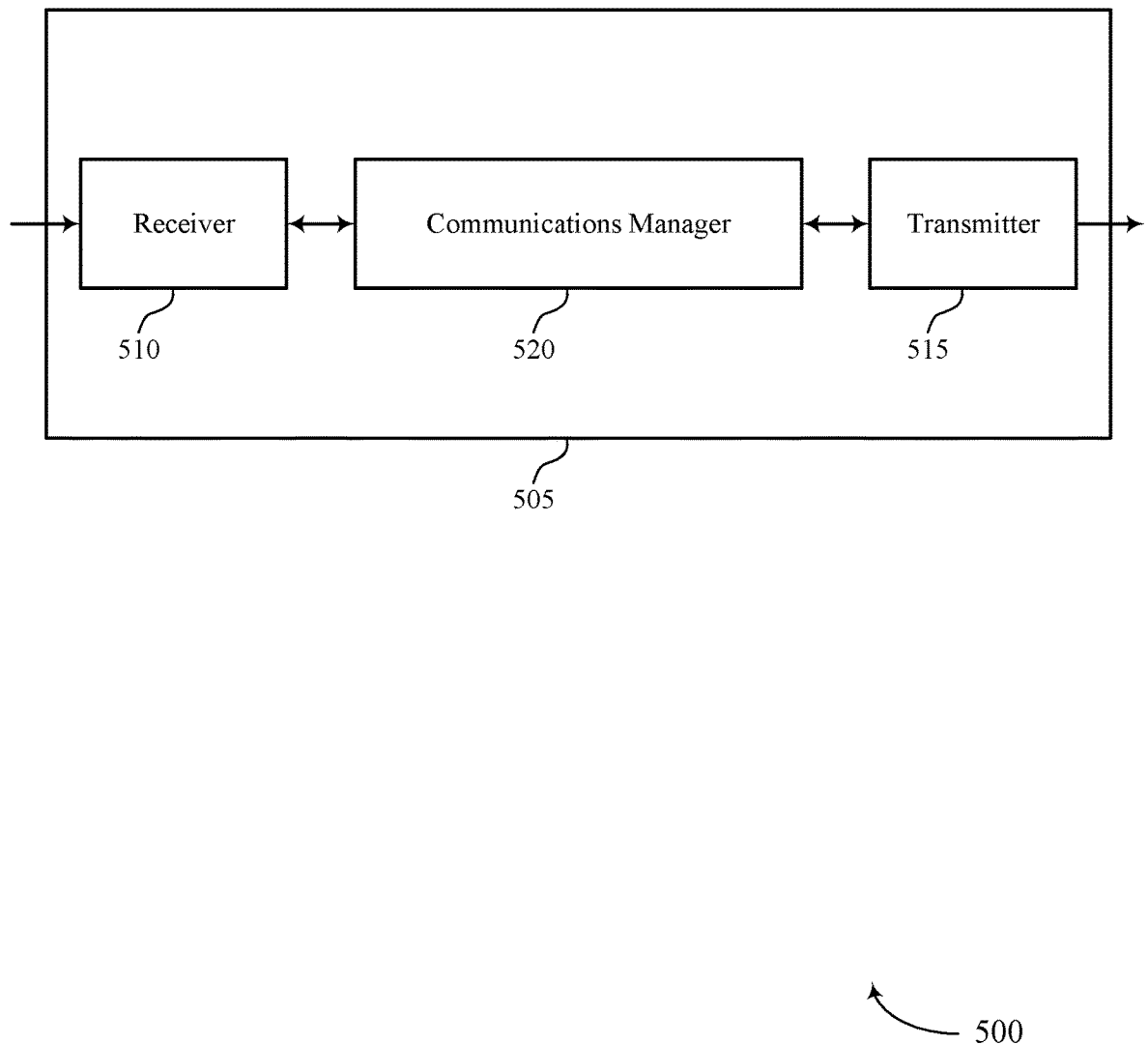
FIGS. 5 and 6 show block diagrams of devices that support techniques for machine learning based PAPR reduction in accordance with aspects of the present disclosure.

FIG. 5 shows a block diagram 500 of a device 505 that supports techniques for machine learning based PAPR reduction in accordance with aspects of the present disclosure. The device 505 may be an example of aspects of a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for machine learning based PAPR reduction). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for machine learning based PAPR reduction). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for machine learning based PAPR reduction as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, an ASIC, a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a base station in accordance with examples as disclosed herein. For example, the communications manager 520 may be configured as or otherwise support a means for establishing a communication link with a UE. The communications manager 520 may be configured as or otherwise support a means for selecting a type of machine learning to be used by the base station for modifying one or more signals. The communications manager 520 may be configured as or otherwise support a means for modifying, basing at least in part on the communication link and the selected type of machine learning, a downlink signal using a signal suppression technique. The communications manager 520 may be configured as or otherwise support a means for transmitting, to the UE over a downlink channel, the modified downlink signal and information indicating the modification of the downlink signal.

By including or configuring the communications manager 520 in accordance with examples as described herein, the device 505 (e.g., a processor controlling or otherwise coupled to the receiver 510, the transmitter 515, the communications manager 520, or any combination thereof) may support techniques for may support reduced power consumption and increased reliability. For example, by reducing PAPR using a PAPR reduction technique, the device 505 may reduce the amount of BO applied to a downlink transmission which may reduce power consumption at the power amplifier as well as reduce component damage at the amplifier. In addition, by utilizing machine learning to adapt or select a PAPR reduction technique based on the condition of a channel, the device 505 may increase reliability of downlink signal. That is, the ability for a UE to successfully decode a downlink signal.

Figure 6:
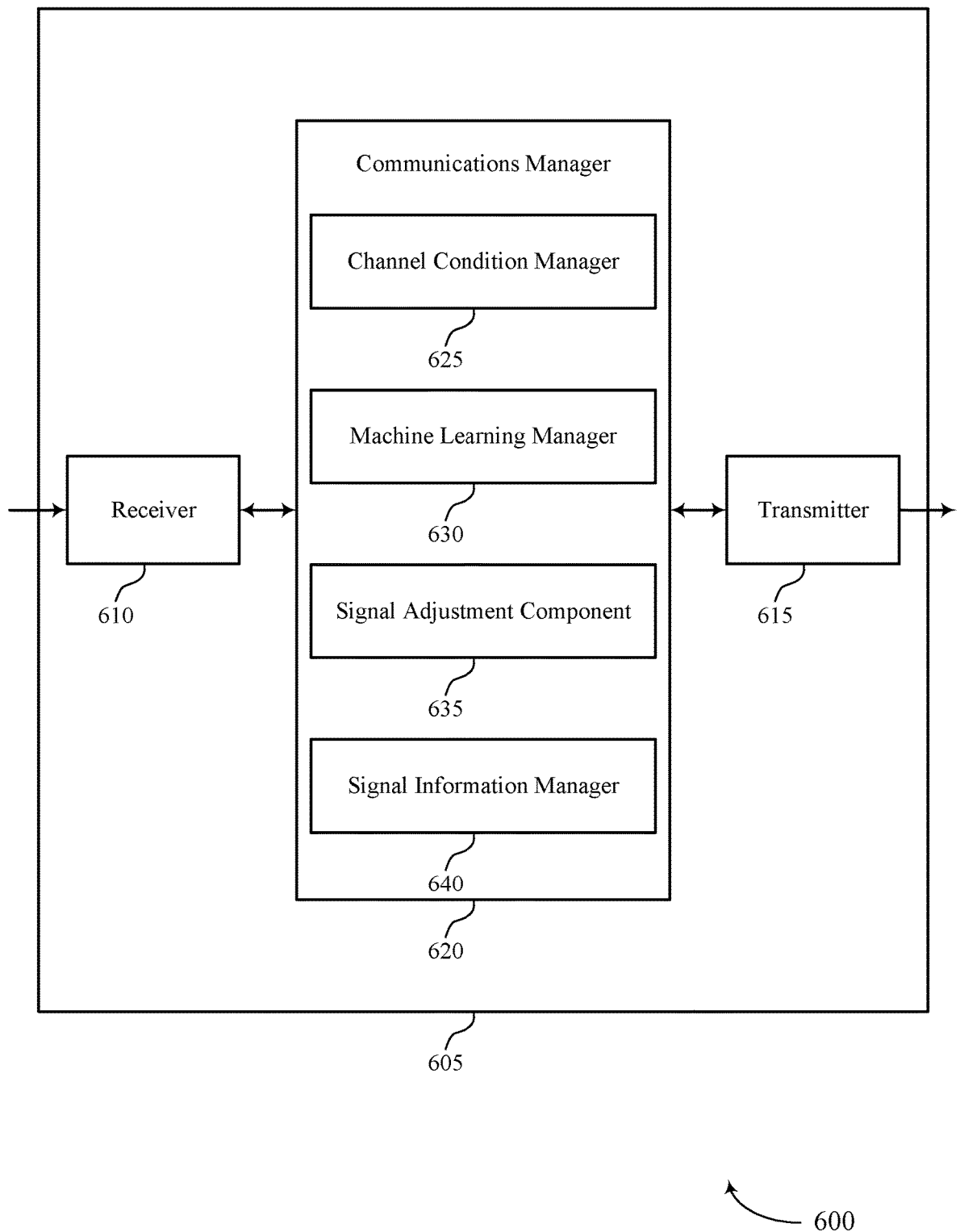

FIG. 6 shows a block diagram 600 of a device 605 that supports techniques for machine learning based PAPR reduction in accordance with aspects of the present disclosure. The device 605 may be an example of aspects of a device 505 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for machine learning based PAPR reduction). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for machine learning based PAPR reduction). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for machine learning based PAPR reduction as described herein. For example, the communications manager 620 may include a channel condition manager 625, a machine learning manager 630, a signal adjustment component 635, a signal information manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a base station in accordance with examples as disclosed herein. The channel condition manager 625 may be configured as or otherwise support a means for establishing a communication link with a UE. The machine learning manager 630 may be configured as or otherwise support a means for selecting a type of machine learning to be used by the base station for modifying one or more signals. The signal adjustment component 635 may be configured as or otherwise support a means for modifying, based on the communication link and the selected type of machine learning, a downlink signal using a signal suppression technique. The signal information manager 640 may be configured as or otherwise support a means for transmitting, to the UE over a downlink channel, the modified downlink signal and information indicating the modification of the downlink signal.

Figure 7:
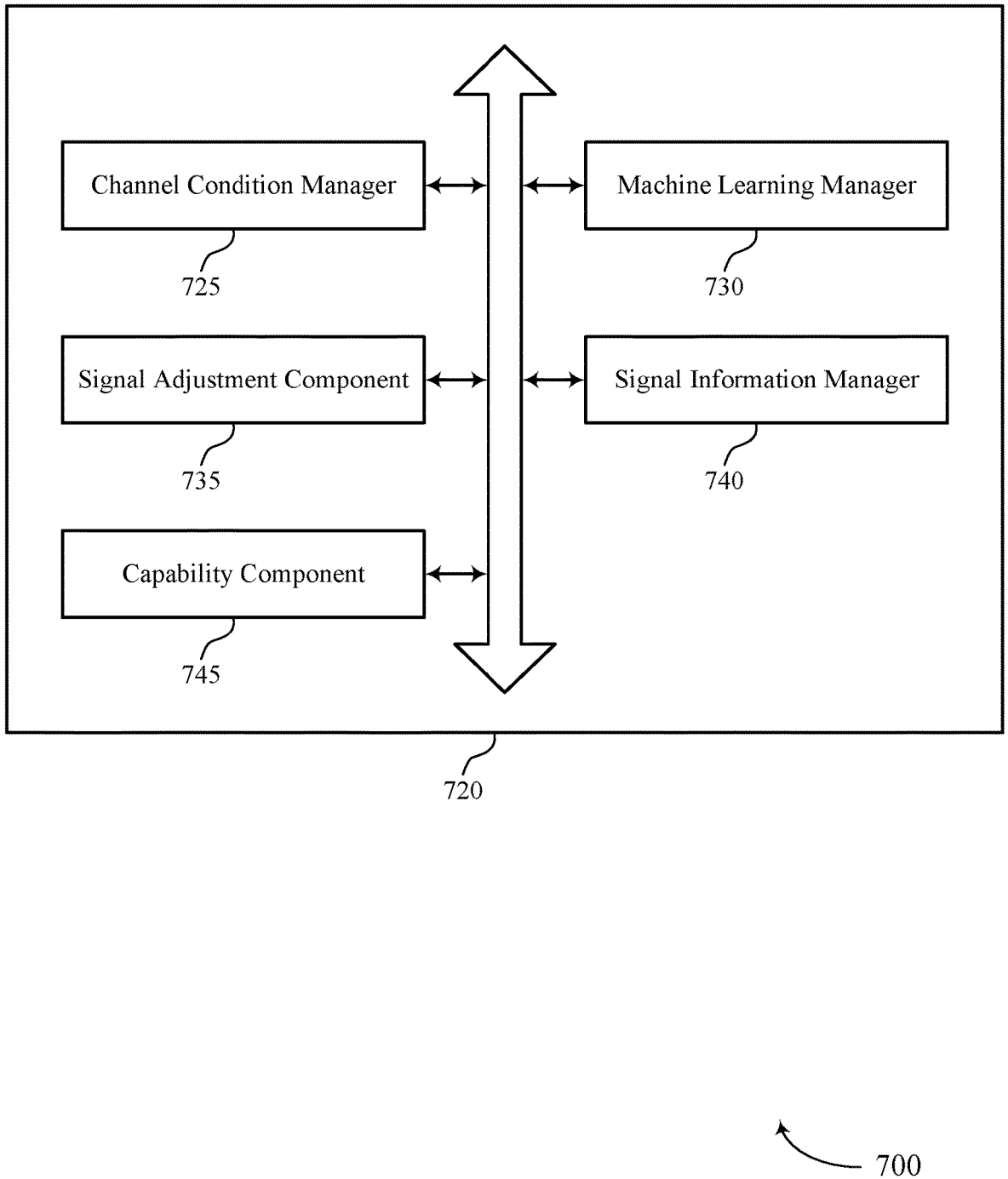
FIG. 7 shows a block diagram of a communications manager that supports techniques for machine learning based PAPR reduction in accordance with aspects of the present disclosure.

FIG. 7 shows a block diagram 700 of a communications manager 720 that supports techniques for machine learning based PAPR reduction in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for machine learning based PAPR reduction as described herein. For example, the communications manager 720 may include a channel condition manager 725, a machine learning manager 730, a signal adjustment component 735, a signal information manager 740, a capability component 745, or any combination thereof. Each of these components may communicate, directly or indirectly, with one another (e.g., via one or more buses).

The communications manager 720 may support wireless communication at a base station in accordance with examples as disclosed herein. The channel condition manager 725 may be configured as or otherwise support a means for establishing a communication link with a UE. The machine learning manager 730 may be configured as or otherwise support a means for selecting a type of machine learning to be used by the base station for modifying one or more signals. The signal adjustment component 735 may be configured as or otherwise support a means for modifying, based on the communication link and the selected type of machine learning, a downlink signal using a signal suppression technique. The signal information manager 740 may be configured as or otherwise support a means for transmitting, to the UE over the downlink channel, the modified downlink signal and information indicating the modification of the downlink signal.

In some examples, the capability component 745 may be configured as or otherwise support a means for receiving, from the UE, a message indicating a capability to restore the downlink signal, where modifying the downlink signal is based on receiving the message indicating the capability to restore the downlink signal.

In some examples, the signal information manager 740 may be configured as or otherwise support a means for generating the information indicating the modification of the downlink signal based on the communication link and the selected type of machine learning, where transmitting the information indicating the modification of the downlink signal is based on generating the information.

In some examples, the machine learning manager 730 may be configured as or otherwise support a means for transmitting, to the UE based on the information indicating the modification of the downlink signal, a message indicating a second type of machine learning for restoring the downlink signal.

In some examples, to support transmitting the message indicating the second type of machine learning, the machine learning manager 730 may be configured as or otherwise support a means for transmitting an algorithm associated with the second type of machine learning, a number of layers associated with the second type of machine learning, a number of neurons associated with the second type of machine learning, or any combination thereof.

In some examples, the algorithm associated with the second type of machine learning includes an ANN algorithm, a CNN algorithm, or an RNN algorithm, or any combination thereof.

In some examples, to support transmitting the message indicating the second type of machine learning, the machine learning manager 730 may be configured as or otherwise support a means for transmitting an RRC message.

In some examples, to support transmitting the information indicating the modification of the downlink signal, the signal information manager 740 may be configured as or otherwise support a means for transmitting at least one of a frequency threshold, amplitude information, position information, or phase information associated with the modified downlink signal.

In some examples, the channel condition manager 725 may be configured as or otherwise support means for receiving, from the UE, one or more feedback messages indicating a condition of the downlink channel. In some examples, the channel condition manager 725 may be configured as or otherwise support a means for receiving, after receiving the one or more feedback messages, one or more CSI messages indicating a channel condition lower than a threshold. In some examples, the machine learning manager 730 may be configured as or otherwise support a means for performing the type of machine learning on data samples associated with the one or more signals based on receiving the one or more CSI messages. In some examples, the signal adjustment component 735 may be configured as or otherwise support a means for modifying the downlink signal using a second signal suppression technique different than the signal suppression technique based on performing the type of machine learning.

In some examples, the channel condition manager 725 may be configured as or otherwise support a means for receiving, after receiving the one or more feedback messages, one or more NACK messages. In some examples, the machine learning manager 730 may be configured as or otherwise support a means for performing the type of machine learning on data samples associated with the one or more signals based on receiving the one or more NACK messages. In some examples, the signal adjustment component 735 may be configured as or otherwise support a means for modifying the downlink signal using a second signal suppression technique different than the signal suppression technique based on performing the type of machine learning.

In some examples, selecting the type of machine learning occurs prior to receiving the one or more feedback messages. In some examples, to support signal suppression technique, the signal adjustment component 735 may be configured as or otherwise support a means for clipping a peak amplitude of the downlink signal based on a level of clipping; or passing the downlink signal through a filter; or both.

In some examples, the signal adjustment component 735 may be configured as or otherwise support a means for determining the level of clipping based on the selected type of machine learning and the communication link, where modifying the downlink signal using the signal suppression technique is based on determining the level of clipping. In some examples, the type of machine learning includes supervised learning, unsupervised learning, or reinforcement learning.

In some examples, to support receiving the one or more feedback messages, the channel condition manager 725 may be configured as or otherwise support a means for receiving at least one of a hybrid automatic repeat request message, a CSI message, a SRS, or any combination thereof.

In some examples, the CSI message includes at least one of a CQI, an RI, a PMI, a CRI, or any combination thereof.

Figure 8:
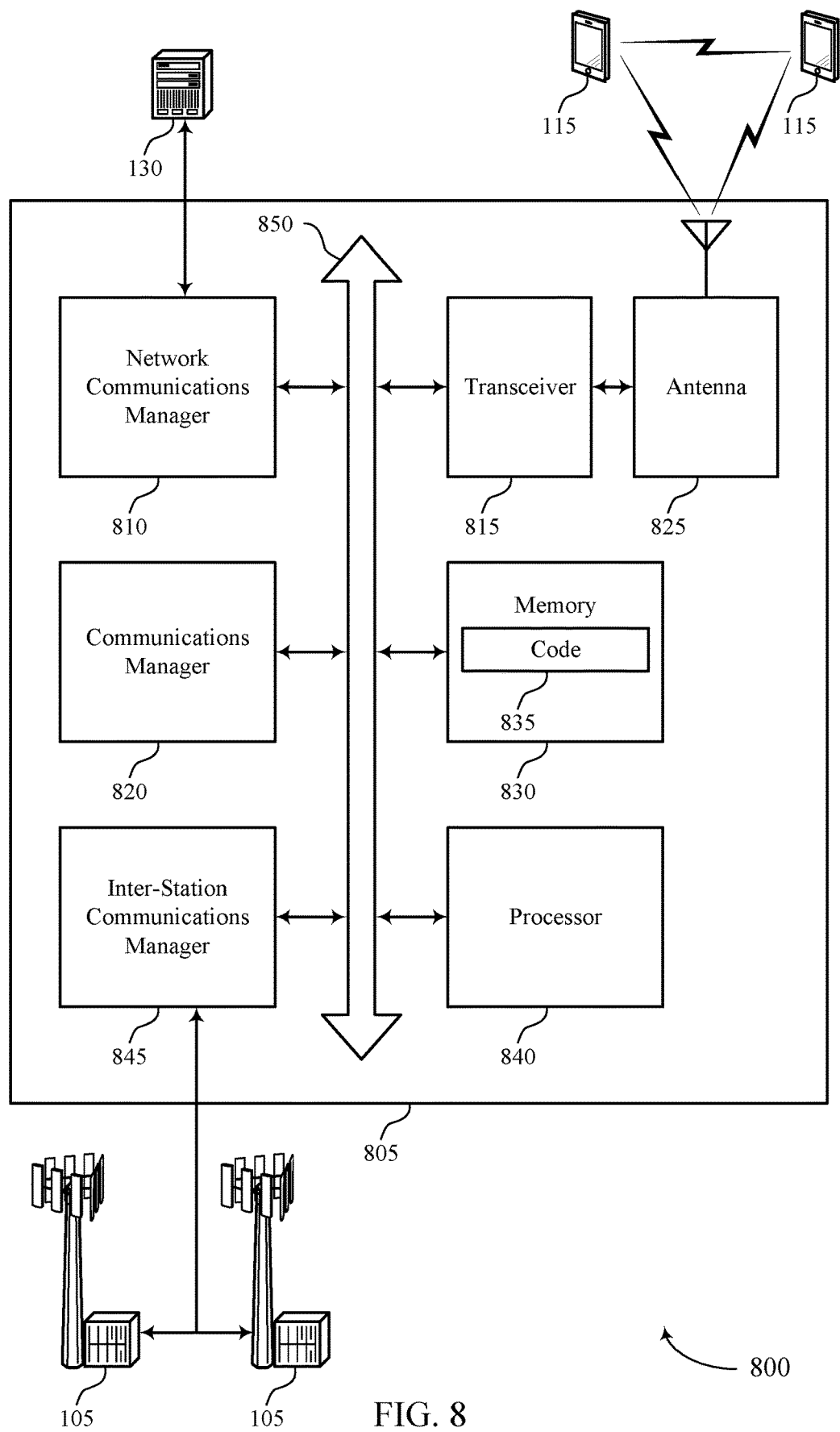
FIG. 8 shows a diagram of a system including a device that supports techniques for machine learning based PAPR reduction in accordance with aspects of the present disclosure.

FIG. 8 shows a diagram of a system 800 including a device 805 that supports techniques for machine learning based PAPR reduction in accordance with aspects of the present disclosure. The device 805 may be an example of or include the components of a device 505, a device 605, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for machine learning based PAPR reduction). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication at a base station in accordance with examples as disclosed herein. For example, the communications manager 820 may be configured as or otherwise support a means for establishing a communication link with a UE. The communications manager 820 may be configured as or otherwise support a means for selecting a type of machine learning to be used by the base station for modifying one or more signals. The communications manager 820 may be configured as or otherwise support a means for modifying, based at least in part on the communication link and the selected type of machine learning, a downlink signal using a signal suppression technique. The communications manager 820 may be configured as or otherwise support a means for transmitting, to the UE over a downlink channel, the modified downlink signal and information indicating the modification of the downlink signal.

By including or configuring the communications manager 820 in accordance with examples as described herein, the device 805 may support techniques for longer battery life as well as a decrease in processing power related to retransmissions. That is, utilizing machine learning may allow the device 805 to take into account the condition of the channel when selecting a PAPR reduction technique which may, in turn, decrease NACK reporting associated with a downlink signal and the subsequent retransmission of the downlink signal.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for machine learning based PAPR reduction as described herein, or the processor 840 and the memory 830 may be otherwise configured to perform or support such operations.

Figure 9:
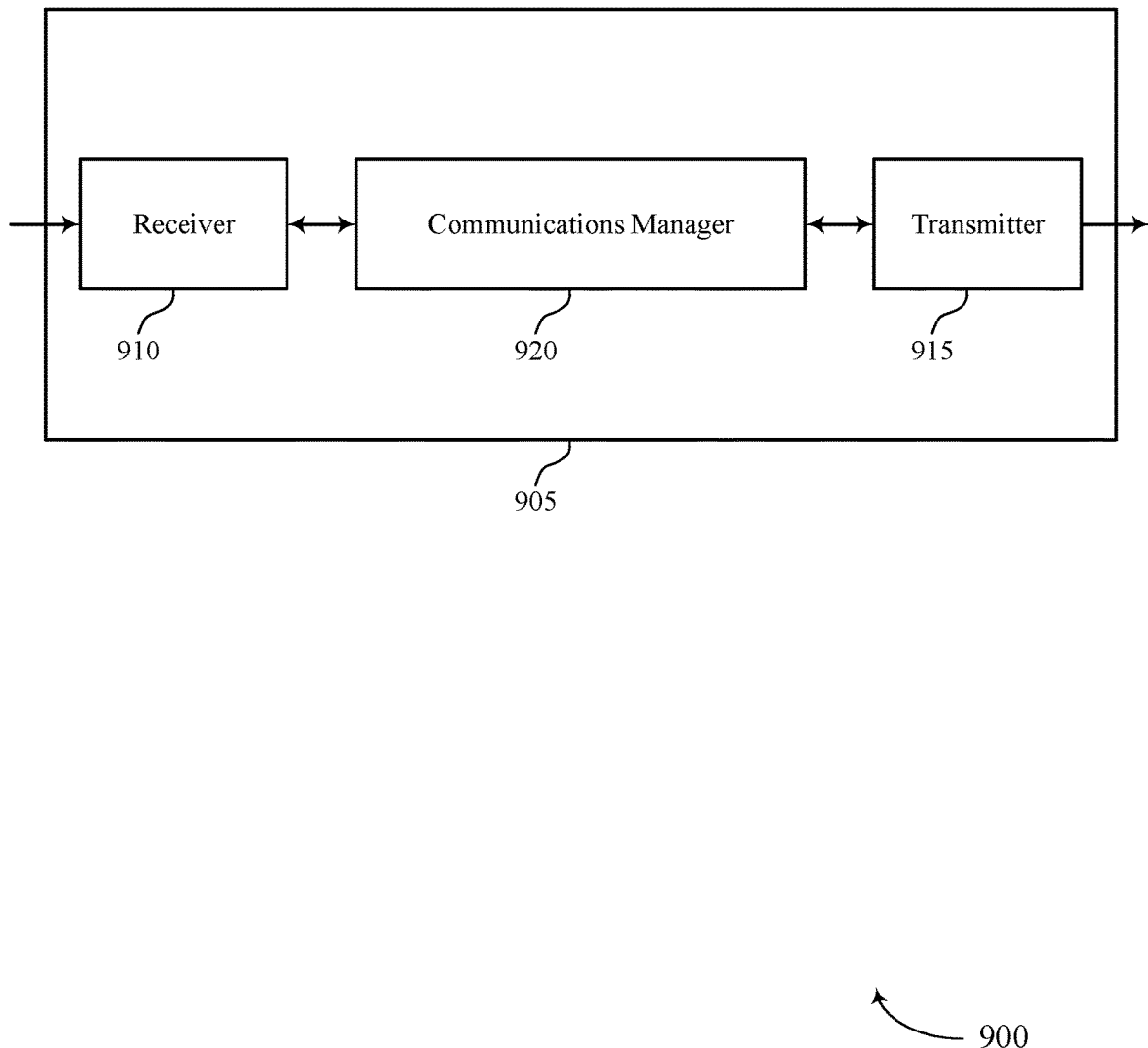
FIGS. 9 and 10 show block diagrams of devices that support techniques for machine learning based PAPR reduction in accordance with aspects of the present disclosure.

FIG. 9 shows a block diagram 900 of a device 905 that supports techniques for machine learning based PAPR reduction in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for machine learning based PAPR reduction). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for machine learning based PAPR reduction). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for machine learning based PAPR reduction as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for establishing a communication link with a base station. The communications manager 920 may be configured as or otherwise support a means for receiving, from the base station over a downlink channel, a downlink signal, information indicating a modification of the downlink signal, and a message indicating a type of machine learning. The communications manager 920 may be configured as or otherwise support a means for restoring the downlink signal based on the indicated type of machine learning and the information indicating the modification of the downlink signal.

By including or configuring the communications manager 920 in accordance with examples as described herein, the device 905 (e.g., a processor controlling or otherwise coupled to the receiver 910, the transmitter 915, the communications manager 920, or any combination thereof) may support techniques for increased reliability. By utilizing machine learning to adapt or select a PAPR reduction technique based on the condition of a channel, a base station may increase reliability of downlink signal. That is, the ability for the device 905 to successfully decode a downlink signal.

Figure 10:
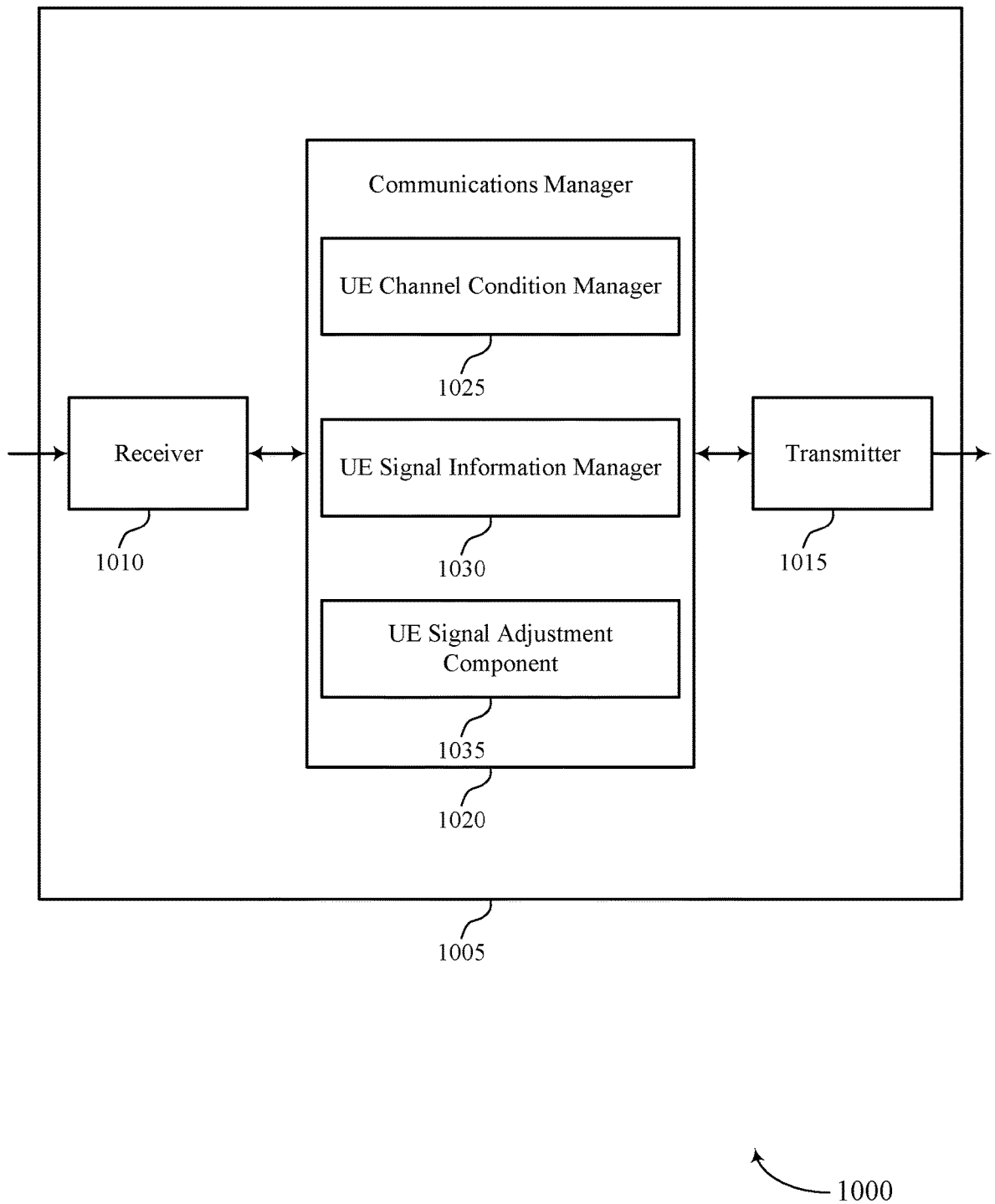

FIG. 10 shows a block diagram 1000 of a device 1005 that supports techniques for machine learning based PAPR reduction in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for machine learning based PAPR reduction). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for machine learning based PAPR reduction). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for machine learning based PAPR reduction as described herein. For example, the communications manager 1020 may include a UE channel condition manager 1025, a UE signal information manager 1030, a UE signal adjustment component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The UE channel condition manager 1025 may be configured as or otherwise support a means for establishing a communication link with a base station. The UE signal information manager 1030 may be configured as or otherwise support a means for receiving, from the base station over a downlink channel, a downlink signal, information indicating a modification of the downlink signal, and a message indicating a type of machine learning. The UE signal adjustment component 1035 may be configured as or otherwise support a means for restoring the downlink signal based on the indicated type of machine learning and the information indicating the modification of the downlink signal.

Figure 11:
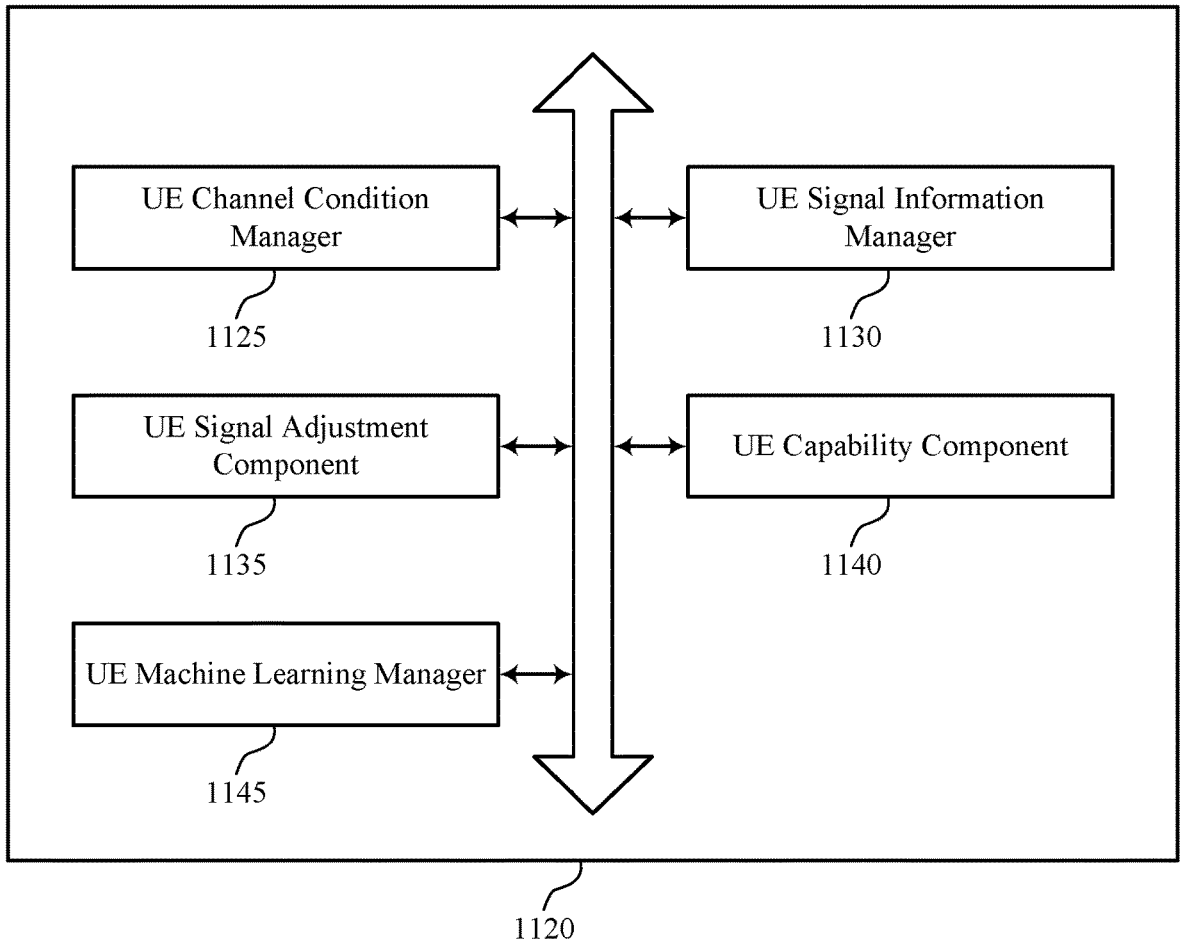
FIG. 11 shows a block diagram of a communications manager that supports techniques for machine learning based PAPR reduction in accordance with aspects of the present disclosure.

FIG. 11 shows a block diagram 1100 of a communications manager 1120 that supports techniques for machine learning based PAPR reduction in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for machine learning based PAPR reduction as described herein. For example, the communications manager 1120 may include a UE channel condition manager 1125, a UE signal information manager 1130, a UE signal adjustment component 1135, a UE capability component 1140, a UE machine learning manager 1145, or any combination thereof. Each of these components may communicate, directly or indirectly, with one another (e.g., via one or more buses).

The communications manager 1120 may support wireless communication at a UE in accordance with examples as disclosed herein. The UE channel condition manager 1125 may be configured as or otherwise support a means for establishing a communication link with a base station. The UE signal information manager 1130 may be configured as or otherwise support a means for receiving, from the base station over a downlink channel, a downlink signal, information indicating a modification of the downlink signal, and a message indicating a type of machine learning. The UE signal adjustment component 1135 may be configured as or otherwise support a means for restoring the downlink signal based on the indicated type of machine learning and the information indicating the modification of the downlink signal.

In some examples, the UE capability component 1140 may be configured as or otherwise support a means for transmitting, to the base station, a message indicating a capability to restore the downlink signal, where restoring the downlink signal is based on transmitting the message indicating the capability to restore the downlink signal.

In some examples, to support receiving the message indicating the type of machine learning, the UE signal information manager 1130 may be configured as or otherwise support a means for receiving an algorithm associated with the type of machine learning, a number of layers associated with the type of machine learning, a number of neurons associated with the type of machine learning, or any combination thereof.

In some examples, the algorithm includes an ANN algorithm, a CNN algorithm, or an RNN algorithm.

In some examples, to support receiving the message indicating the type of machine learning, the UE signal information manager 1130 may be configured as or otherwise support a means for receiving an RRC message.

In some examples, the information indicating the modification of the downlink signal includes at least one of a level of clipping, amplitude information, position information, or phase information associated with the downlink signal.

In some examples, receiving the message indicating the type of machine learning occurs before receiving the message indicating the condition of the downlink channel and information indicating the modification of the downlink signal.

In some example, the UE channel condition manager 1125 may be configured as or otherwise support a means for transmitting, to the base station, one or more feedback messages indicating a condition of the downlink channel. In some examples, to support transmitting the one or more feedback messages, the UE channel condition manager 1125 may be configured as or otherwise support a means for transmitting at least one of a hybrid automatic repeat request message, a CSI message, a SRS, or any combination thereof.

In some examples, the CSI message includes a CQI, an RI, a PMI, a CRI, or any combination thereof.

In some examples, the UE machine learning manager 1145 may be configured as or otherwise support a means for receiving, from the base station, a message indicating a second type of machine learning for restoring the downlink signal, where restoring the downlink signal is based on receiving the message.

Figure 12:
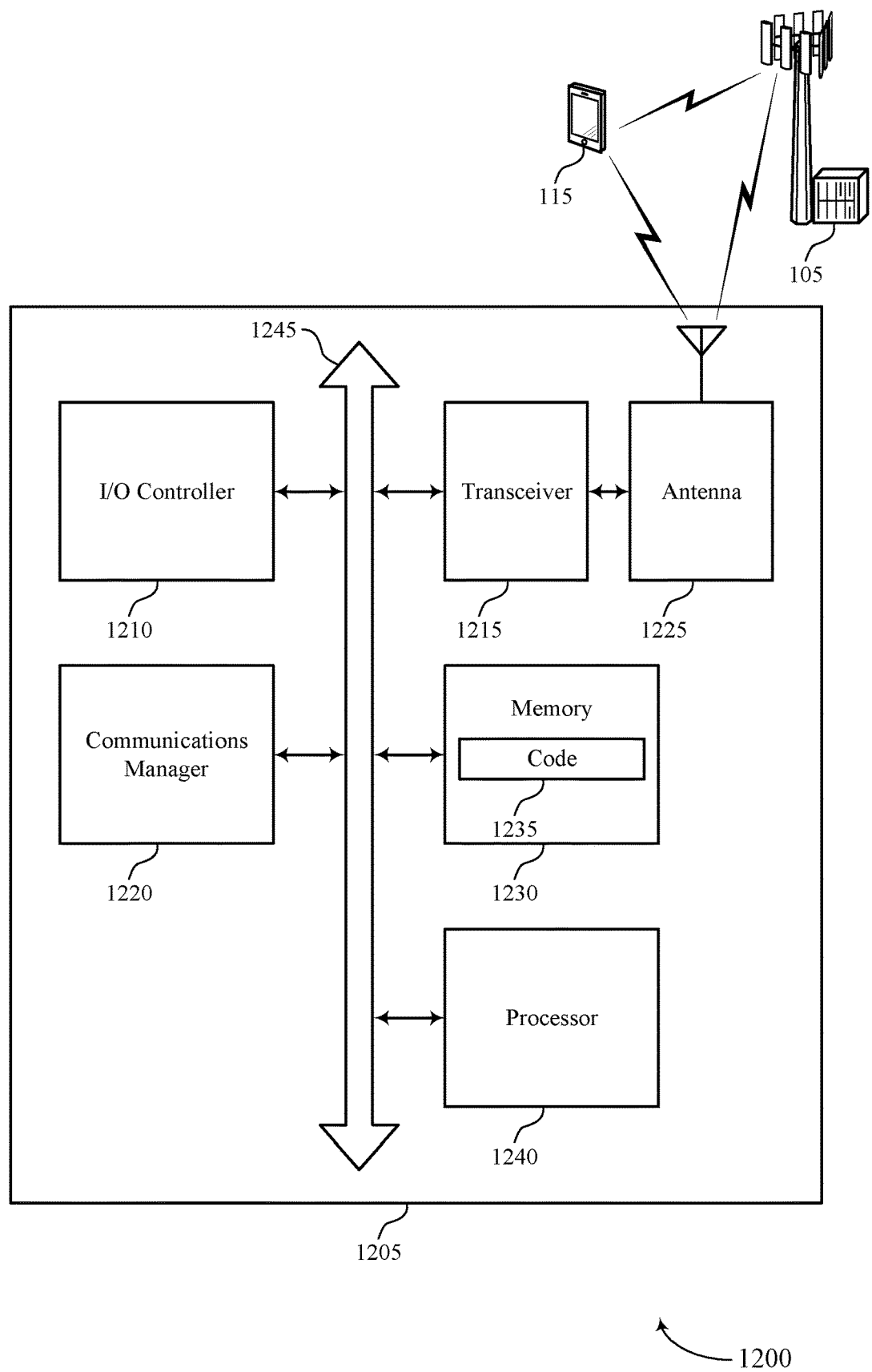
FIG. 12 shows a diagram of a system including a device that supports techniques for machine learning based PAPR reduction in accordance with aspects of the present disclosure.

FIG. 12 shows a diagram of a system 1200 including a device 1205 that supports techniques for machine learning based PAPR reduction in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for machine learning based PAPR reduction). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for establishing a communication link with a base station. The communications manager 1220 may be configured as or otherwise support a means for receiving, from the base station over a downlink channel, a downlink signal, information indicating a modification of the downlink signal, and a message indicating a type of machine learning. The communications manager 1220 may be configured as or otherwise support a means for restoring the downlink signal based on the indicated type of machine learning and the information indicating the modification of the downlink signal.

By including or configuring the communications manager 1220 in accordance with examples as described herein, the device 1205 may support techniques for a decrease in processing power related to retransmissions. That is, utilizing machine learning may allow a base station to take into account the condition of the channel when selecting a PAPR reduction technique which may, in turn, decrease NACK reporting from the device 1205 associated with a downlink signal and the subsequent retransmission of the downlink signal.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for machine learning based PAPR reduction as described herein, or the processor 1240 and the memory 1230 may be otherwise configured to perform or support such operations.

Figure 13:
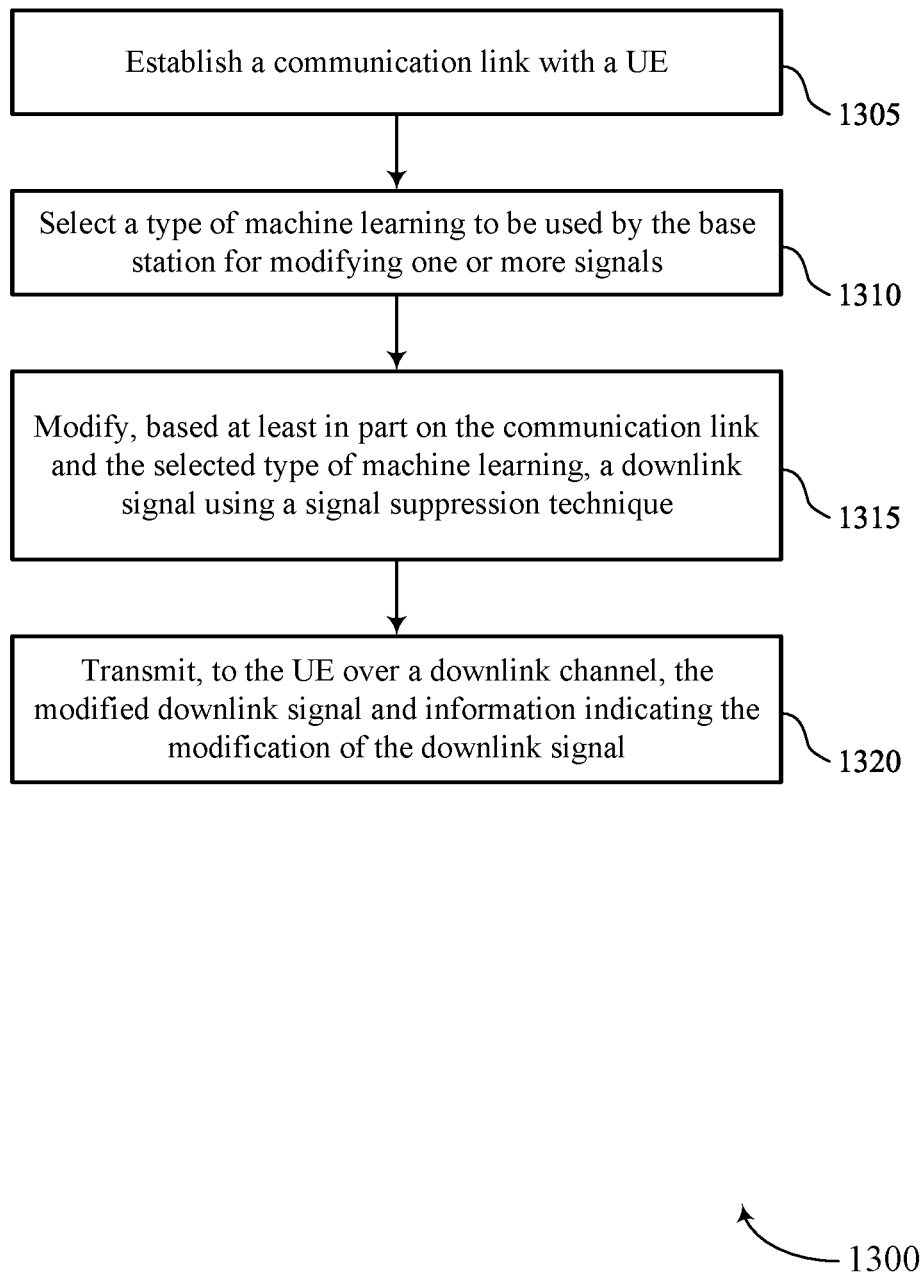
FIGS. 13 through 17 show flowcharts illustrating methods that support techniques for machine learning based PAPR reduction in accordance with aspects of the present disclosure.

FIG. 13 shows a flowchart illustrating a method 1300 that supports techniques for machine learning based PAPR reduction in accordance with aspects of the present disclosure. The operations of the method 1300 may be implemented by a base station or its components as described herein. For example, the operations of the method 1300 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1305, the method may include establishing a communication link with a UE. The operations of 1305 may be performed in accordance with examples as disclosed herein. In some examples, aspects of the operations of 1305 may be performed by a channel condition manager 725 as described with reference to FIG. 7.

At 1310, the method may include selecting a type of machine learning to be used by the base station for modifying one or more signals. The operations of 1310 may be performed in accordance with examples as disclosed herein. In some examples, aspects of the operations of 1310 may be performed by a machine learning manager 730 as described with reference to FIG. 7.

At 1315, the method may include modifying, based on the communication link and the selected type of machine learning, a downlink signal using a signal suppression technique. The operations of 1315 may be performed in accordance with examples as disclosed herein. In some examples, aspects of the operations of 1315 may be performed by a signal adjustment component 735 as described with reference to FIG. 7.

At 1320, the method may include transmitting, to the UE over a downlink channel, the modified downlink signal and information indicating the modification of the downlink signal. The operations of 1320 may be performed in accordance with examples as disclosed herein. In some examples, aspects of the operations of 1320 may be performed by a signal information manager 740 as described with reference to FIG. 7.

Figure 14:
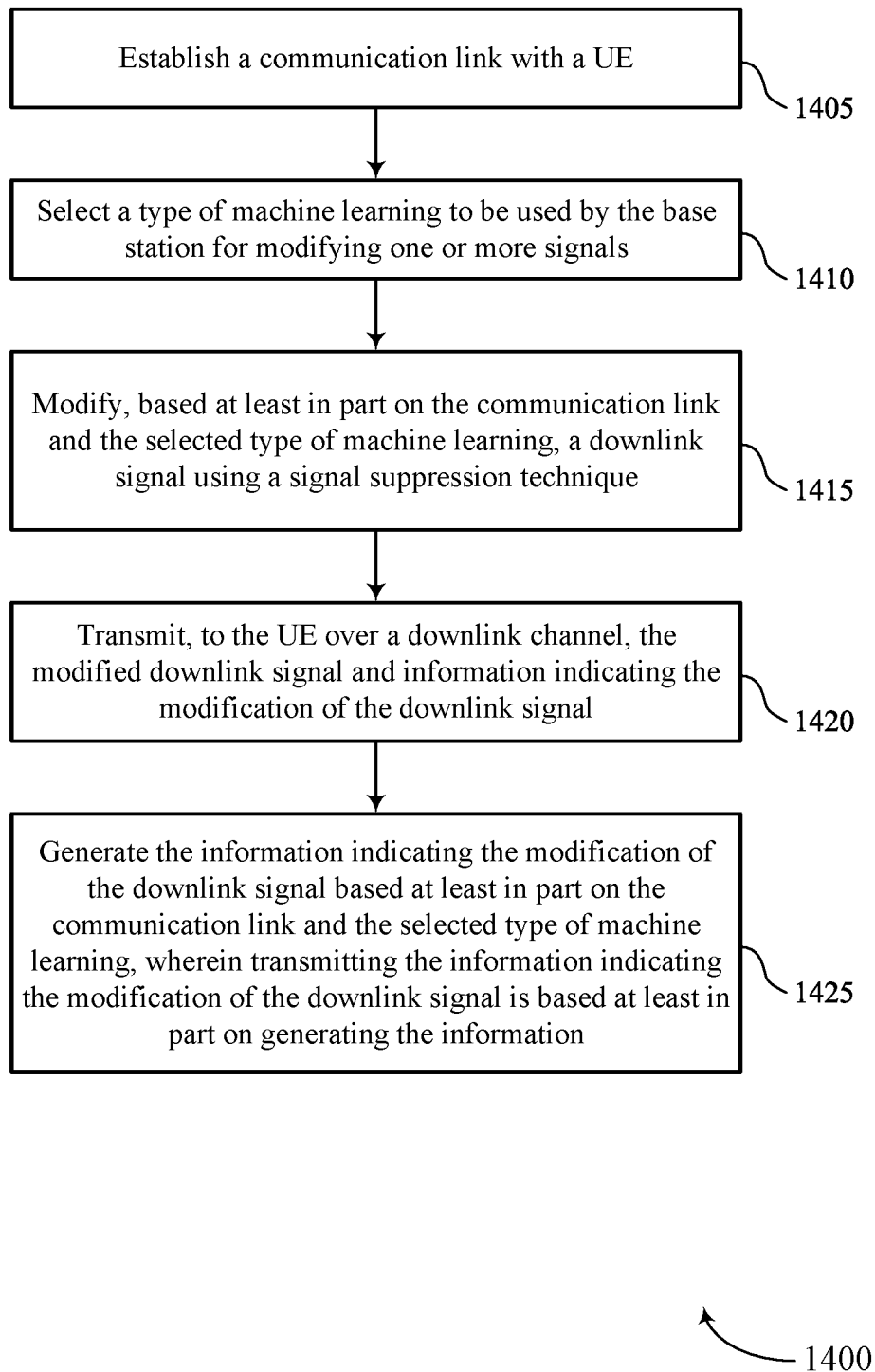

FIG. 14 shows a flowchart illustrating a method 1400 that supports techniques for machine learning based PAPR reduction in accordance with aspects of the present disclosure. The operations of the method 1400 may be implemented by a base station or its components as described herein. For example, the operations of the method 1400 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1405, the method may include establishing a communication link with a UE. The operations of 1405 may be performed in accordance with examples as disclosed herein. In some examples, aspects of the operations of 1405 may be performed by a channel condition manager 725 as described with reference to FIG. 7.

At 1410, the method may include selecting a type of machine learning to be used by the base station for modifying one or more signals. The operations of 1410 may be performed in accordance with examples as disclosed herein. In some examples, aspects of the operations of 1410 may be performed by a machine learning manager 730 as described with reference to FIG. 7.

At 1415, the method may include modifying, based on the communication link and the selected type of machine learning, a downlink signal using a signal suppression technique. The operations of 1415 may be performed in accordance with examples as disclosed herein. In some examples, aspects of the operations of 1415 may be performed by a signal adjustment component 735 as described with reference to FIG. 7.

At 1420, the method may include transmitting, to the UE over a downlink channel, the modified downlink signal and information indicating the modification of the downlink signal. The operations of 1420 may be performed in accordance with examples as disclosed herein. In some examples, aspects of the operations of 1420 may be performed by a signal information manager 740 as described with reference to FIG. 7.

At 1425, the method may include generating the information indicating the modification of the downlink signal based on the communication link and the selected type of machine learning, where transmitting the information indicating the modification of the downlink signal is based on generating the information. The operations of 1425 may be performed in accordance with examples as disclosed herein. In some examples, aspects of the operations of 1425 may be performed by a signal information manager 740 as described with reference to FIG. 7.

Figure 15:
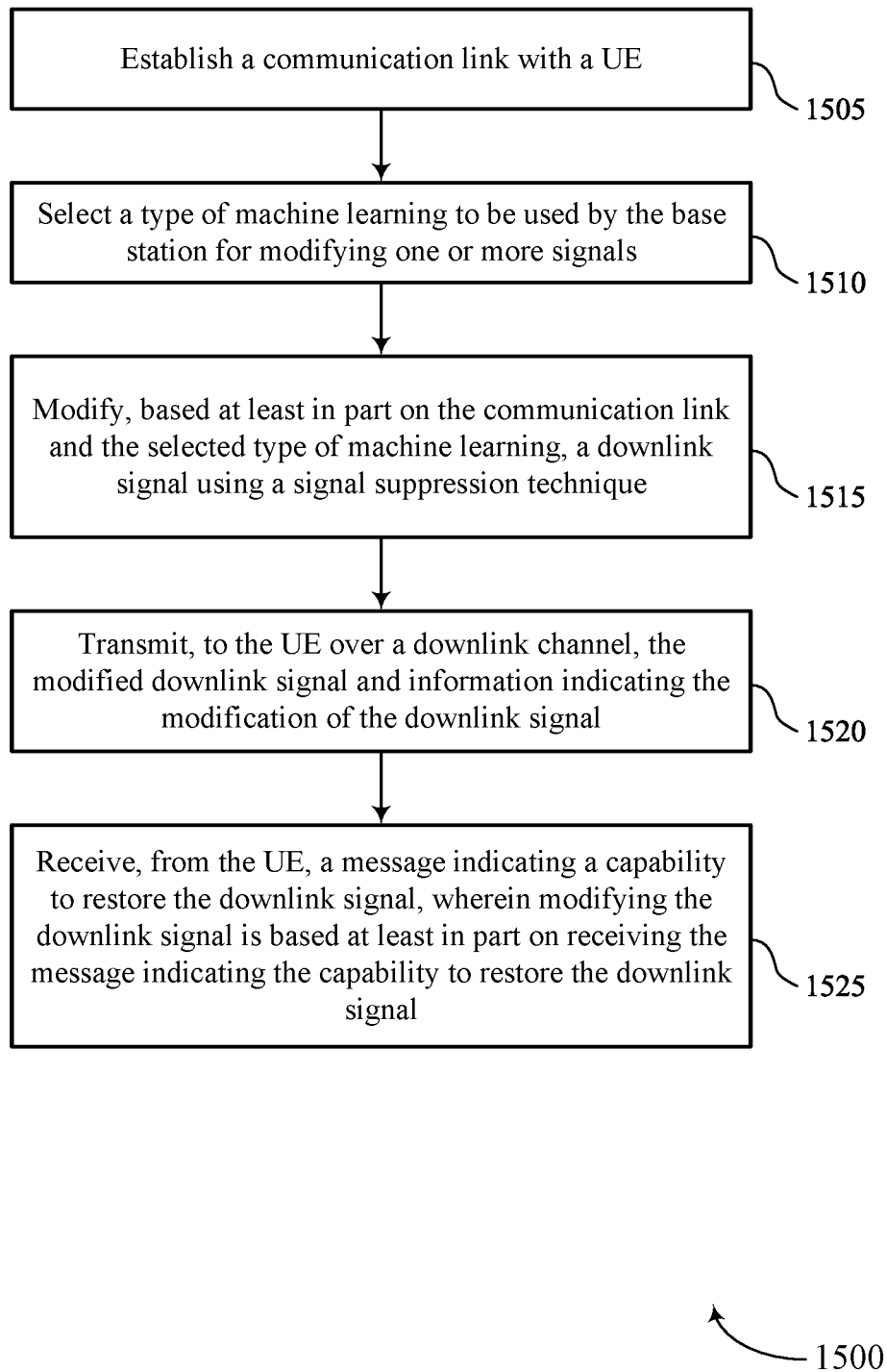

FIG. 15 shows a flowchart illustrating a method 1500 that supports techniques for machine learning based PAPR reduction in accordance with aspects of the present disclosure. The operations of the method 1500 may be implemented by a base station or its components as described herein. For example, the operations of the method 1500 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1505, the method may include establishing a communication link with a UE. The operations of 1505 may be performed in accordance with examples as disclosed herein. In some examples, aspects of the operations of 1505 may be performed by a channel condition manager 725 as described with reference to FIG. 7.

At 1510, the method may include selecting a type of machine learning to be used by the base station for modifying one or more signals. The operations of 1510 may be performed in accordance with examples as disclosed herein. In some examples, aspects of the operations of 1510 may be performed by a machine learning manager 730 as described with reference to FIG. 7.

At 1515, the method may include modifying, based on the communication link and the selected type of machine learning, a downlink signal using a signal suppression technique. The operations of 1515 may be performed in accordance with examples as disclosed herein. In some examples, aspects of the operations of 1515 may be performed by a signal adjustment component 735 as described with reference to FIG. 7.

At 1520, the method may include transmitting, to the UE over a downlink channel, the modified downlink signal and information indicating the modification of the downlink signal. The operations of 1520 may be performed in accordance with examples as disclosed herein. In some examples, aspects of the operations of 1520 may be performed by a signal information manager 740 as described with reference to FIG. 7.

At 1525, the method may include receiving, from the UE, a message indicating a capability to restore the downlink signal, where modifying the downlink signal is based on receiving the message indicating the capability to restore the downlink signal. The operations of 1525 may be performed in accordance with examples as disclosed herein. In some examples, aspects of the operations of 1525 may be performed by a capability component 745 as described with reference to FIG. 7.

Figure 16:
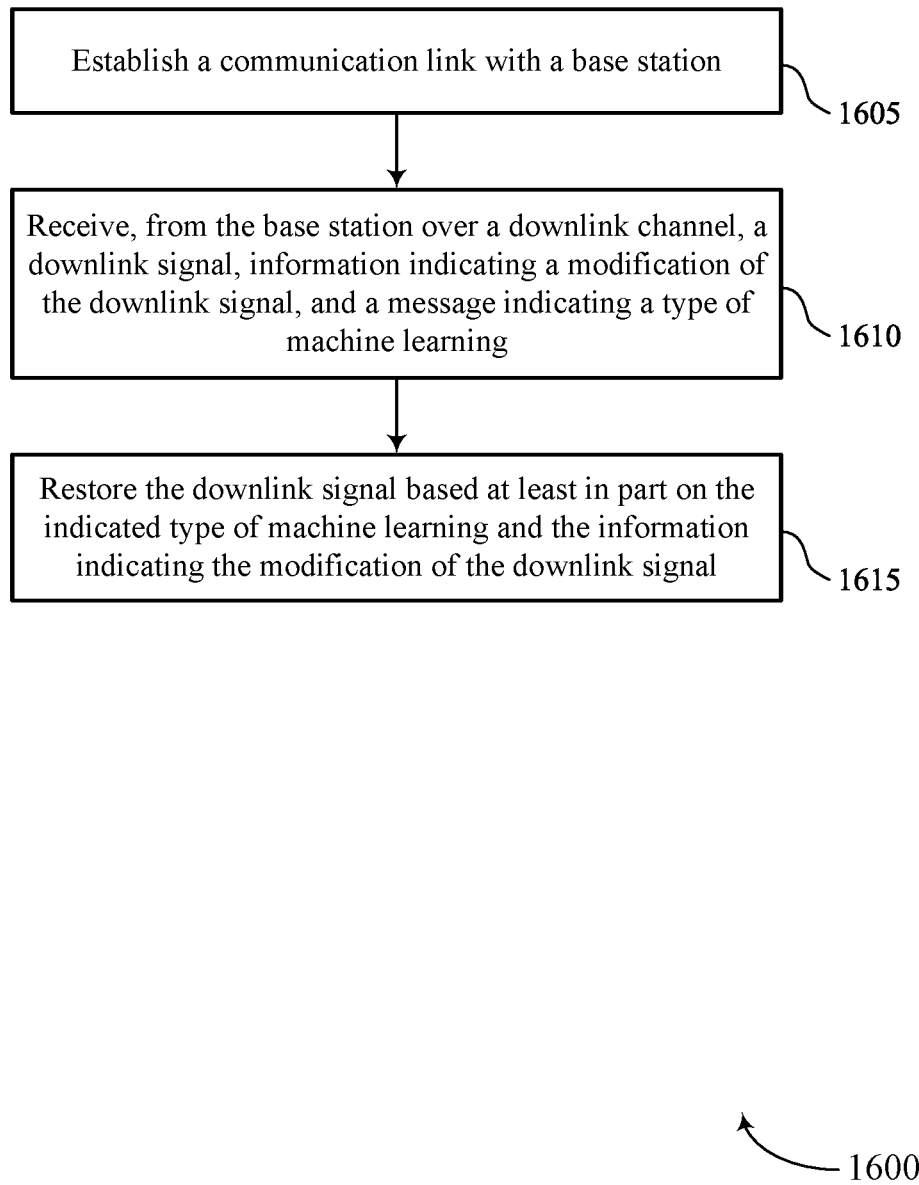

FIG. 16 shows a flowchart illustrating a method 1600 that supports techniques for machine learning based PAPR reduction in accordance with aspects of the present disclosure. The operations of the method 1600 may be implemented by a UE or its components as described herein. For example, the operations of the method 1600 may be performed by a UE 115 as described with reference to FIGS. 1 through 4 and 9 through 12. In some examples, a UE may execute a set of instructions to control the functional elements of the UE to perform the described functions. Additionally or alternatively, the UE may perform aspects of the described functions using special-purpose hardware.

At 1605, the method may include establishing a communication link with a base station. The operations of 1605 may be performed in accordance with examples as disclosed herein. In some examples, aspects of the operations of 1605 may be performed by a UE channel condition manager 1125 as described with reference to FIG. 11.

At 1610, the method may include receiving, from the base station over a downlink channel, a downlink signal, information indicating a modification of the downlink signal, and a message indicating a type of machine learning. The operations of 1610 may be performed in accordance with examples as disclosed herein. In some examples, aspects of the operations of 1610 may be performed by a UE signal information manager 1130 as described with reference to FIG. 11.

At 1615, the method may include restoring the downlink signal based on the indicated type of machine learning and the information indicating the modification of the downlink signal. The operations of 1615 may be performed in accordance with examples as disclosed herein. In some examples, aspects of the operations of 1615 may be performed by a UE signal adjustment component 1135 as described with reference to FIG. 11.

Figure 17:
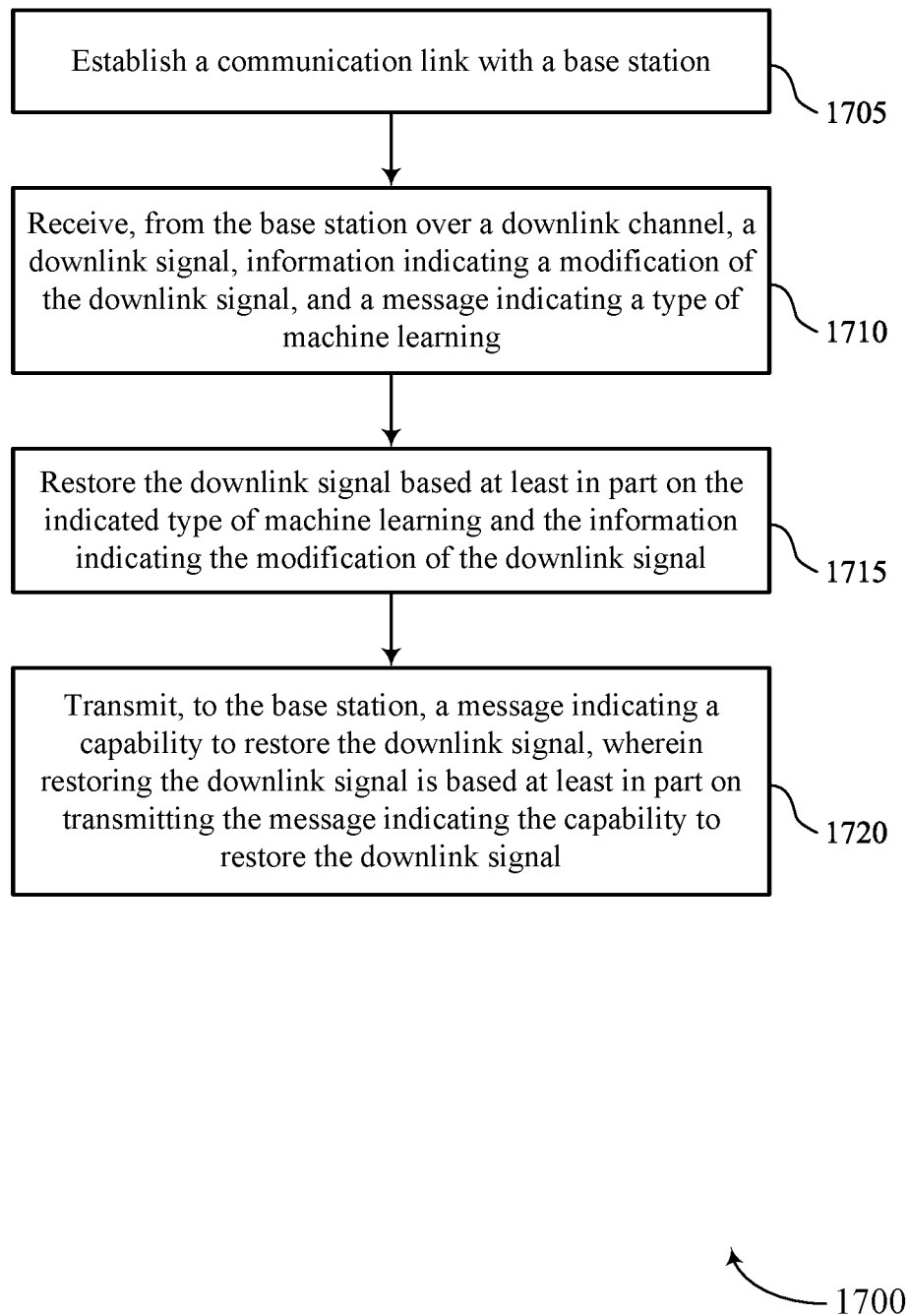

FIG. 17 shows a flowchart illustrating a method 1700 that supports techniques for machine learning based PAPR reduction in accordance with aspects of the present disclosure. The operations of the method 1700 may be implemented by a UE or its components as described herein. For example, the operations of the method 1700 may be performed by a UE 115 as described with reference to FIGS. 1 through 4 and 9 through 12. In some examples, a UE may execute a set of instructions to control the functional elements of the UE to perform the described functions. Additionally or alternatively, the UE may perform aspects of the described functions using special-purpose hardware.

At 1705, the method may include establishing a communication link with a base station. The operations of 1705 may be performed in accordance with examples as disclosed herein. In some examples, aspects of the operations of 1705 may be performed by a UE channel condition manager 1125 as described with reference to FIG. 11.

At 1710, the method may include receiving, from the base station over a downlink channel, a downlink signal, information indicating a modification of the downlink signal, and a message indicating a type of machine learning. The operations of 1710 may be performed in accordance with examples as disclosed herein. In some examples, aspects of the operations of 1710 may be performed by a UE signal information manager 1130 as described with reference to FIG. 11.

At 1715, the method may include restoring the downlink signal based on the indicated type of machine learning and the information indicating the modification of the downlink signal. The operations of 1715 may be performed in accordance with examples as disclosed herein. In some examples, aspects of the operations of 1715 may be performed by a UE signal adjustment component 1135 as described with reference to FIG. 11.

At 1720, the method may include transmitting, to the base station, a message indicating a capability to restore the downlink signal, where restoring the downlink signal is based on transmitting the message indicating the capability to restore the downlink signal. The operations of 1720 may be performed in accordance with examples as disclosed herein. In some examples, aspects of the operations of 1720 may be performed by a UE capability component 1140 as described with reference to FIG. 11.

The following provides an overview of aspects of the present disclosure:

Aspect 1: A method for wireless communication at a base station, comprising: establishing a communication link with a UE; selecting a type of machine learning to be used by the base station for modifying one or more signals; modifying, based at least in part on the communication link and the selected type of machine learning, a downlink signal using a signal suppression technique; and transmitting, to the UE over a downlink channel, the modified downlink signal and information indicating the modification of the downlink signal.

Aspect 2: The method of aspect 1, further comprising: receiving, from the UE, a message indicating a capability to restore the downlink signal, wherein modifying the downlink signal is based at least in part on receiving the message indicating the capability to restore the downlink signal.

Aspect 3: The method of any of aspects 1 through 2, further comprising: generating the information indicating the modification of the downlink signal based at least in part on the communication link and the selected type of machine learning, wherein transmitting the information indicating the modification of the downlink signal is based at least in part on generating the information.

Aspect 4: The method of any of aspects 1 through 3, further comprising: receiving, from the UE, one or more feedback messages indicating a condition of the downlink channel.

Aspect 5: The method of aspect 4, further comprising: receiving, after receiving the one or more feedback messages, one or more CSI messages indicating a channel condition lower than a threshold; performing the type of machine learning on data samples associated with the one or more signals based at least in part on receiving the one or more CSI messages; and modifying the downlink signal using a second signal suppression technique different than the signal suppression technique based at least in part on performing the type of machine learning.

Aspect 6: The method of any of aspects 4 through 5, further comprising: receiving, after receiving the one or more feedback messages, one or more NACK messages; performing the type of machine learning on data samples associated with the one or more signals based at least in part on receiving the one or more NACK messages; and modifying the downlink signal using a second signal suppression technique different than the signal suppression technique based at least in part on performing the type of machine learning.

Aspect 7: The method of any of aspects 4 through 6, wherein selecting the type of machine learning occurs prior to receiving the one or more feedback messages.

Aspect 8: The method of any of aspects 4 through 7, wherein receiving the one or more feedback messages comprises: receiving at least one of a HARQ message, a CSI message, an SRS, or any combination thereof.

Aspect 9: The method of aspect 8, wherein the CSI message comprises at least one of a CQI, an RI, a PMI, a CRI, or any combination thereof.

Aspect 10: The method of any of aspects 1 through 9, further comprising: transmitting, to the UE based at least in part on the information indicating the modification of the downlink signal, a message indicating a second type of machine learning for restoring the downlink signal.

Aspect 11: The method of aspect 10, wherein transmitting the message indicating the second type of machine learning comprises: transmitting an algorithm associated with the second type of machine learning, a number of layers associated with the second type of machine learning, a number of neurons associated with the second type of machine learning, or any combination thereof.

Aspect 12: The method of aspect 11, wherein the algorithm associated with the second type of machine learning comprises an ANN algorithm, a CNN algorithm, or an RNN algorithm, or any combination thereof.

Aspect 13: The method of any of aspects 10 through 12, wherein transmitting the message indicating the second type of machine learning comprises: transmitting an RRC message.

Aspect 14: The method of any of aspects 1 through 13, wherein transmitting the information indicating the modification of the downlink signal comprises: transmitting at least one of a level of clipping, amplitude information, position information, or phase information associated with the modified downlink signal.

Aspect 15: The method of any of aspects 1 through 14, wherein the signal suppression technique comprises: clipping a peak amplitude of the downlink signal based on a level of clipping; or passing the downlink signal through a filter; or both.

Aspect 16: The method of aspect 15, further comprising: determining the level of clipping based at least in part on the selected type of machine learning and the communication link, wherein modifying the downlink signal using the signal suppression technique is based at least in part on determining the level of clipping.

Aspect 17: The method of any of aspects 1 through 16, wherein the type of machine learning comprises supervised learning, unsupervised learning, or reinforcement learning.

Aspect 18: A method for wireless communication at a UE, comprising: establishing a communication link with a base station; receiving, from the base station over a downlink channel, a downlink signal, information indicating a modification of the downlink signal, and a message indicating a type of machine learning; and restoring the downlink signal based at least in part on the indicated type of machine learning and the information indicating the modification of the downlink signal.

Aspect 19: The method of aspect 18, further comprising: transmitting, to the base station, a message indicating a capability to restore the downlink signal, wherein restoring the downlink signal is based at least in part on transmitting the message indicating the capability to restore the downlink signal.

Aspect 20: The method of any of aspects 18 through 19, further comprising: transmitting, to the base station, one or more feedback messages indicating a condition of the downlink channel.

Aspect 21: The method of aspect 20, wherein transmitting the one or more feedback messages comprises: transmitting at least one of a HARQ message, a CSI message, an SRS, or any combination thereof.

Aspect 22: The method of aspect 21, wherein the CSI message comprises a CQI, an RI, a PMI, a CRI, or any combination thereof.

Aspect 23: The method of any of aspects 18 through 22, wherein receiving the message indicating the type of machine learning comprises: receiving an algorithm associated with the type of machine learning, a number of layers associated with the type of machine learning, a number of neurons associated with the type of machine learning, or any combination thereof.

Aspect 24: The method of aspect 23, wherein the algorithm comprises an ANN algorithm, a CNN algorithm, or an RNN algorithm.

Aspect 25: The method of any of aspects 18 through 24, wherein receiving the message indicating the type of machine learning comprises: receiving an RRC message.

Aspect 26: The method of any of aspects 18 through 25, wherein the information indicating the modification of the downlink signal comprises at least one of a level of clipping, amplitude information, position information, or phase information associated with the downlink signal.

Aspect 27: The method of any of aspects 18 through 26, wherein receiving the message indicating the type of machine learning occurs before receiving the downlink signal and information indicating the modification of the downlink signal.

Aspect 28: The method of any of aspects 18 through 27, further comprising: receiving, from the base station, a message indicating a second type of machine learning for restoring the downlink signal, wherein restoring the downlink signal is based at least in part on receiving the message Aspect 29: An apparatus for wireless communication at a base station, comprising a processor; memory coupled with the processor; and instructions stored in the memory and executable by the processor to cause the apparatus to perform a method of any of aspects 1 through 17.

Aspect 30: An apparatus for wireless communication at a base station, comprising at least one means for performing a method of any of aspects 1 through 17.

Aspect 31: A non-transitory computer-readable medium storing code for wireless communication at a base station, the code comprising instructions executable by a processor to perform a method of any of aspects 1 through 17.

Aspect 32: An apparatus for wireless communication at a UE, comprising a processor; memory coupled with the processor; and instructions stored in the memory and executable by the processor to cause the apparatus to perform a method of any of aspects 18 through 28.

Aspect 33: An apparatus for wireless communication at a UE, comprising at least one means for performing a method of any of aspects 18 through 28.

Aspect 34: A non-transitory computer-readable medium storing code for wireless communication at a UE, the code comprising instructions executable by a processor to perform a method of any of aspects 18 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as any combination of computing devices (e.g., any combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a network device, comprising:
    establishing a communication link with a user equipment (UE);
    selecting, based at least in part on establishing the communication link with the UE, a type of machine learning to be used by the network device for modifying one or more signals;
    receiving, from the UE, one or more feedback messages indicative of a decoding outcome of a signal communicated from the network device to the UE;
    inputting, based on the one or more feedback messages, the decoding outcome into an algorithm for peak to average power ratio reduction that supports the type of machine learning;
    selecting, based at least in part on an output of the algorithm that supports the type of machine learning, a signal suppression technique from a plurality of different signal suppression techniques comprising clipping a peak amplitude of a downlink signal, passing the downlink signal through a filter, and a combination of clipping the peak amplitude of the downlink signal and passing the downlink signal through the filter;
    modifying the downlink signal using the signal suppression technique; and
    transmitting, to the UE over a downlink channel, the modified downlink signal and information indicating the modification of the downlink signal.

2. The method of claim 1, further comprising:
    receiving, from the UE, a message indicating a capability to restore the downlink signal, wherein modifying the downlink signal is based at least in part on receiving the message indicating the capability to restore the downlink signal.

3. The method of claim 1, further comprising:
    generating the information indicating the modification of the downlink signal based at least in part on the communication link and the selected type of machine learning, wherein transmitting the information indicating the modification of the downlink signal is based at least in part on generating the information.

4. The method of claim 1, further comprising:
    inputting a condition associated with the communication link into the algorithm that supports the type of machine learning; and
    receiving, from the UE, one or more feedback messages indicating the condition associated with the communication link, wherein the condition associated with the communication link comprises a condition of the downlink channel.

5. The method of claim 4, further comprising:
receiving, after receiving the one or more feedback messages, one or more channel state information messages indicating a channel condition lower than a threshold;
performing the type of machine learning on data samples associated with the one or more signals based at least in part on receiving the one or more channel state information messages; and
modifying the downlink signal using a second signal suppression technique different than the signal suppression technique based at least in part on performing the type of machine learning.

6. The method of claim 4, further comprising:
receiving, after receiving the one or more feedback messages, one or more negative acknowledgement messages;
performing the type of machine learning on data samples associated with the one or more signals based at least in part on receiving the one or more negative acknowledgement messages; and
modifying the downlink signal using a second signal suppression technique different than the signal suppression technique based at least in part on performing the type of machine learning.

7. The method of claim 4, wherein selecting the type of machine learning occurs prior to receiving the one or more feedback messages.

8. The method of claim 4, wherein receiving the one or more feedback messages comprises:
receiving at least one of a hybrid automatic repeat request message, a channel state information message, a sounding reference signal, or any combination thereof.

9. The method of claim 8, wherein the channel state information message comprises at least one of a channel quality indicator, a rank indicator, a precoder matrix indicator, a channel state information resource indicator, or any combination thereof.

10. The method of claim 1, further comprising:
transmitting, to the UE based at least in part on the information indicating the modification of the downlink signal, a message indicating a second type of machine learning for restoring the downlink signal.

11. The method of claim 10, wherein transmitting the message indicating the second type of machine learning comprises:
transmitting an algorithm associated with the second type of machine learning, a number of layers associated with the second type of machine learning, a number of neurons associated with the second type of machine learning, or any combination thereof.

12. The method of claim 11, wherein the algorithm associated with the second type of machine learning comprises an artificial neural network algorithm, a convolution neural network algorithm, or a recurrent neural network algorithm, or any combination thereof.

13. The method of claim 10, wherein transmitting the message indicating the second type of machine learning comprises:
transmitting a radio resource control message.

14. The method of claim 1, further comprising:
generating phase information, amplitude information, or position information associated with the modified downlink signal based at least in part on the selected signal suppression technique; and
transmitting the amplitude information, the position information, or the phase information associated with the modified downlink signal.

15. The method of claim 1, further comprising:
determining a level of clipping for clipping the peak amplitude based at least in part on the selected type of machine learning and the communication link, wherein modifying the downlink signal using the signal suppression technique is based at least in part on determining the level of clipping.

16. The method of claim 1, wherein the type of machine learning comprises supervised learning, unsupervised learning, or reinforcement learning.

17. An apparatus for wireless communication at a network device, comprising:
one or more processors;
memory coupled with the one or more processors; and
instructions stored in the memory and executable by the one or more processors to cause the apparatus to:
establish a communication link with a user equipment (UE);
select, based at least in part on establishing the communication link with the UE, a type of machine learning to be used by the network device for modifying one or more signals;
receive, from the UE, one or more feedback messages indicative of a decoding outcome of a signal communicated from the network device to the UE;
input, based on the one or more feedback messages, the decoding outcome into an algorithm for peak to average power ratio reduction that supports the type of machine learning;
select, based at least in part on an output of the algorithm that supports the type of machine learning, a signal suppression technique from a plurality of different signal suppression techniques comprising clipping a peak amplitude of a downlink signal, passing the downlink signal through a filter, and a combination of clipping the peak amplitude of the downlink signal and passing the downlink signal through the filter;
modify the downlink signal using the signal suppression technique; and
transmit, to the UE over a downlink channel, the modified downlink signal and information indicating the modification of the downlink signal.

* * * * *